(12) United States Patent
Zhang et al.

(10) Patent No.: US 7,787,404 B2
(45) Date of Patent: *Aug. 31, 2010

(54) METHOD AND APPARATUS FOR MEASURING LATENCY OF A COMPUTER NETWORK

(75) Inventors: Kui Zhang, Cupertino, CA (US); Frank G. Bordonaro, Los Gatos, CA (US); Satyanarayana R. Raparla, San Jose, CA (US); John Lautmann, Freemont, CA (US)

(73) Assignee: Cisco Technology, Inc., San Jose, CA (US)

( * ) Notice: Subject to any disclaimer, the term of this patent is extended or adjusted under 35 U.S.C. 154(b) by 962 days.

This patent is subject to a terminal disclaimer.

(21) Appl. No.: 11/416,708

(22) Filed: May 3, 2006

(65) Prior Publication Data

US 2006/0203808 A1   Sep. 14, 2006

Related U.S. Application Data

(63) Continuation of application No. 10/926,808, filed on Aug. 26, 2004, now Pat. No. 7,088,706, which is a continuation of application No. 09/345,193, filed on Jun. 30, 1999, now Pat. No. 7,154,858.

(51) Int. Cl.
*G08C 17/00* (2006.01)
*H04L 12/28* (2006.01)
*H04L 12/56* (2006.01)

(52) U.S. Cl. .................. 370/311; 370/400; 370/410

(58) Field of Classification Search ............... 370/352, 370/360, 401, 412, 465, 311, 400, 410; 709/223, 709/224, 225, 227; 714/712
See application file for complete search history.

(56) References Cited

U.S. PATENT DOCUMENTS

| 5,477,531 | A | | 12/1995 | McKee et al. |
| 5,606,669 | A | | 2/1997 | Bertin et al. |
| 5,740,366 | A | * | 4/1998 | Mahany et al. ............... 709/227 |
| 5,781,534 | A | | 7/1998 | Perlman |
| 5,802,106 | A | | 9/1998 | Packer |
| 5,878,032 | A | * | 3/1999 | Mirek et al. ................. 370/252 |
| 5,892,754 | A | * | 4/1999 | Kompella et al. ............ 370/236 |

(Continued)

FOREIGN PATENT DOCUMENTS

EP   1335525 A2   8/2003

OTHER PUBLICATIONS

Perlman, Radia, Interconnections: Bridges and Routers, (1992) pp. 184-189.

(Continued)

*Primary Examiner*—Ronald Abelson
(74) *Attorney, Agent, or Firm*—Cesari and McKenna, LLP

(57) ABSTRACT

A method for operating a computer network has a source router transmit a first message to be received by an intermediate router of the computer network, the first message to activate the intermediate router to listen for a designated time period for the intermediate router to receive a second message. Upon receiving a second message by the intermediate router during the designated time period, the intermediate router responds to the second message in response to receiving the second message during the designated time period.

32 Claims, 11 Drawing Sheets

U.S. PATENT DOCUMENTS

| | | | |
|---|---|---|---|
| 5,902,697 A | | 5/1999 | Guindy et al. |
| 5,903,735 A | | 5/1999 | Kidder et al. |
| 5,920,697 A | * | 7/1999 | Masters et al. ............. 709/219 |
| 5,931,961 A | * | 8/1999 | Ranganathan et al. ....... 714/712 |
| 6,012,096 A | | 1/2000 | Link et al. |
| 6,021,113 A | * | 2/2000 | Doshi et al. ................. 370/228 |
| 6,023,733 A | | 2/2000 | Periasamy et al. |
| 6,031,841 A | | 2/2000 | Woundy |
| 6,178,160 B1 | | 1/2001 | Bolton |
| 6,178,181 B1 | * | 1/2001 | Glitho ........................ 370/467 |
| 6,185,219 B1 | * | 2/2001 | Christie ...................... 370/410 |
| 6,282,575 B1 | | 8/2001 | Lin et al. |
| 6,286,052 B1 | * | 9/2001 | McCloghrie et al. ........ 709/238 |
| 6,317,775 B1 | | 11/2001 | Coile et al. |
| 6,393,016 B2 | | 5/2002 | Wegner et al. |
| 6,442,608 B1 | | 8/2002 | Knight et al. |
| 6,545,979 B1 | * | 4/2003 | Poulin ..................... 370/241.1 |
| 6,601,098 B1 | | 7/2003 | Case et al. |
| 6,611,868 B1 | * | 8/2003 | Arutyunov ................. 709/227 |
| 6,724,727 B2 | | 4/2004 | Counterman |
| 6,738,349 B1 | | 5/2004 | Cen |
| 6,810,426 B2 | | 10/2004 | Mysore et al. |
| 2002/0049854 A1 | | 4/2002 | Cox et al. |
| 2002/0124080 A1 | | 9/2002 | Leighton et al. |

OTHER PUBLICATIONS

Request for Comments: 792, "Internet Control Message Protocol" Sep. 1981.

C. Metz, RSVP: General-Purpose Signaling for IP, IEEE Internet Computing, May-Jun. 1999.

S. Deering, ICMP Router Discovery Messages, Request for Comments (RFC) 1256, Sep. 1991.

RFC 791-IP Header Option: Strict Source and Record Route, Connected: An Internet Encyclopedia, May 28, 1999.

RFC 791-IP Header Option: Record Route, Connected: An Internet Encyclopedia, May 28, 1999.

RFC 791-IP Header Option: Loose Source and Record Route, Connected: An Internet Encyclopedia, May 28, 1999.

RSVP for the Multimedia Party, Cisco systems, Inc., Feb. 24, 1998.

D. Katz, IP Router Alert Option, Request for Comments (RFC) 2113, Feb. 1997.

Switching Paths Overview, Cisco Systems, Inc., Oct. 26, 1998.

D. Awduche et al., Extensions to RSVP for Traffic Engineering, Internet Engineering Task Force (IETF), MPLS & RSVP Working Groups, Internet Draft, Aug. 1998.

R. Perlman, Interconnections: Bridges and Routers, Copyright 1992 by Addison-Wesley Publishing Company, Inc., pp. 178-184.

T. Li et al., A Provider Architecture for Differentiated Services and Traffic Engineering (PASTE), Internet Engineering Task Force (IETF), Network Working Group, Request for Comments (RFC) 2430, Oct. 1998.

Petition to Correct Filing Date for U.S. Appl. No. 09/345,193, filed Apr. 27, 2004, pp. 1-5.

Request for Reconsideration of Petition to Correct Filing Date for U.S. Appl. No. 09/345,193, filed Apr. 27, 2004, pp. 1-6.

U.S. Patent and Trademark Office, Decision on Petition to Correct Filing Date, Derek L. Woods, Mailed: Feb. 17, 2005.

* cited by examiner

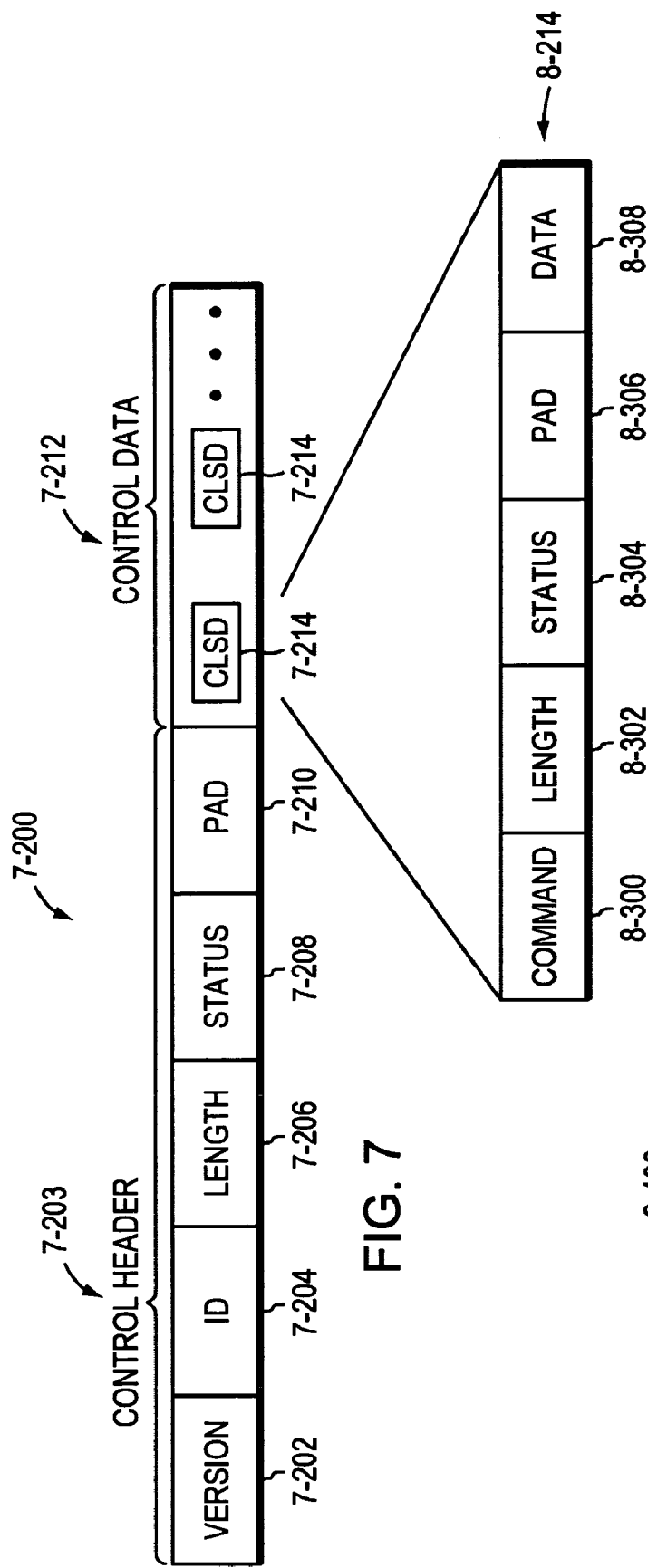
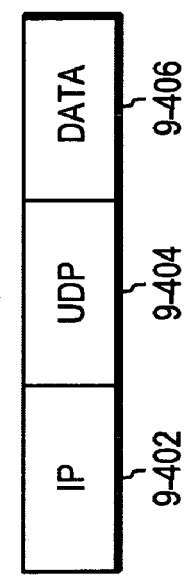
FIG. 7
FIG. 8
FIG. 9

US 7,787,404 B2

METHOD AND APPARATUS FOR MEASURING LATENCY OF A COMPUTER NETWORK

RELATED APPLICATIONS

This Patent Application is a Continuation Application of parent patent application Ser. No. 10/926,808 filed on Aug. 26, 2004 now U.S. Pat. No. 7,088,706. Parent application Ser. No. 10/926,808 filed on Aug. 28, 2004 is a Continuation Application of the parent application Ser. No. 09/345,193 filed on Jun. 30, 1999 now U.S. Pat. No. 7,154,858. The parent application Ser. No. 09/345,193 filed on Jun. 30, 1999 incorporates by reference in its entirety the U.S. patent application Ser. No. 09/346,080 filed on Jul. 1, 1999, entitled Protocol to Coordinate Network End Points to Measure Network Latency, now issued as U.S. Pat. No. 6,662,223 on Dec. 9, 2003. The text of incorporated U.S. patent application Ser. No. 09/346,080 filed on Jul. 1, 1999, is explicitly written herein, and the incorporated text is indicated hereinbelow by section headings "Network Latency".

FIELD OF THE INVENTION

This invention relates generally to computer networks and, more specifically, to a system for accurately measuring the latency through a computer network.

BACKGROUND OF THE INVENTION

Organizations, including businesses, governments and educational institutions, increasingly rely on computer networks to share and exchange information. A computer network typically comprises a plurality of interconnected entities. An entity may consist of any device, such as a host or server, that sources (i.e., transmits) and/or receives messages. A common type of computer network is a local area network ("LAN") which typically refers to a privately owned network within a single building or campus. In many instances, several LANs may be interconnected by point-to-point links, microwave transceivers, satellite hook-ups, etc. to form a wide area network ("WAN") or intranet that may span an entire city, country or continent. An organization employing multiple intranets, moreover, may interconnect them through the Internet. Remote users may also utilize the Internet to contact and exchange information with the organization's intranet.

One or more intermediate network devices are often used to couple LANs together and allow the corresponding entities to exchange information. For example, a bridge may be used to provide a "bridging" function between two or more LANs or a switch may be utilized to provide a "switching" function for transferring information between a plurality of LANs. A router is often used to interconnect LANs executing different LAN standards, to interconnect two or more intranets and/or to provide connectivity to the Internet. Routers typically provide higher level functionality than bridges or switches.

In order to reduce design complexity, most computer networks are organized as a series of "layers". Each layer implements particular rules and conventions referred to as a protocol. The set of layers, moreover, are arranged to form a protocol stack. One of the most widely implemented protocol stacks is the Transmission Control Protocol/Internet Protocol (TCP/IP) Reference Model. The TCP/IP Reference Model defines five layers, which are termed, in ascending order: physical, data link, network, transport and application. The TCP/IP Reference Model basically provides a packet switched or connectionless communication service. That is, each message from a source to a destination carries the full address of the destination, and each one is routed through the network independent of the others. As a result, two messages from the same source to the same destination may follow different routes or paths through the network, depending on the level of congestion and other factors present at the time the two messages are sent.

To interconnect dispersed computer networks, many organizations rely on the infrastructure and facilities of service providers. For example, an organization may lease a number of T1 lines to interconnect various LANs. These organizations typically enter into service level agreements (SLAs) with the service providers, which include one or more traffic specifiers. The traffic specifiers may place limits on the amount of resources that the subscribing organization will consume for a given charge. For example, a user may agree not to send traffic that exceeds a certain bandwidth (e.g., 1 Mb/s). Traffic specifiers may also state the performance characteristics that are to be guaranteed by the service provider. For example, certain applications, such as videoconferencing and audio or voice applications, are highly susceptible to latency in the network. For example, voice over IP applications typically require less than 150 milliseconds of one-way delay time.

As a result, service providers and network managers are interested in determining the latency of their networks. One method to measure latency is to simply time stamp a message, send it across the network and determine how long it takes to reach its destination. However, as described above, two messages sent from the same source to the same destination may follow entirely different paths across a network. Accordingly, this approach may yield different results each time it is performed, since each message may follow a different path. Thus, to be meaningful, latency should refer to a specific path through the network.

The Internet Protocol (IP) provides a mechanism, known as source routing, for ensuring that a message follows a specific, predetermined network path. With source routing, each message carries the list of intermediate devices that the message must visit as it travels from the source to the destination. By specifying a particular set of devices, a message can be constrained to follow a select path. Source routing is implemented by adding a particular option to each message.

FIG. 1A is a block diagram of a conventional network layer message 100 that complies with version 4 of the IP protocol. Message 100 includes an IP header 102 and a data portion 104. The IP header 102 consists of a plurality of fields, including a version field 106, an IP header length field 108, a type_of_service (ToS) field 110, a total message length field 112, an identification field 114, a flags field 116 and a fragment offset field 118. Additional header fields include a time to live (TTL) field 120, a protocol field 122, which specifies the transport layer protocol to which message 100 should be passed, and a checksum field 124. The IP header 102 of each message 100 further includes an IP source address (IP SA) field 126 that identifies the source of the message 100 and an IP destination address (IP DA) field 128 that specifies the intended recipient of the message 100.

If desired, one or more options may be added to the IP header 102 following the IP DA field 128 in an options area 130. For example, options area 130 may include a source routing option 132. The IP protocol actually specifies two options that relate to source routing: strict source routing and loose source routing. In strict source routing, the entire list of layer 3 devices, such as routers and layer 3 switches, through which message 100 must pass as it travels from the source to the destination is specified. In loose source routing, only those layer 3 devices that message 100 must not miss as it travels from the source to the destination are identified. Source routing option 132 similarly includes a plurality of fields, such as a type field 134 (which is set to "131" for loose and "137" for strict routing), a length field 136 that specifies the length of options. 132, a pointer field 138 and a route data field 140 that contains the list of layer 3 devices to be visited. Within data field 140, the layer 3 devices are identified by their IP addresses. The value of pointer field 138, moreover, identifies the particular address within route data field 140 to which message 100 is to be forwarded. Thus, before transmitting message 100, a layer 3 device advances the pointer of field 138 to identify the next address in the list.

IP message 100 may be encapsulated in a transport layer message. FIG. 1B is a partial block diagram of a transport layer message 150. The transport layer message 150 preferably includes a source port field 152, a destination port field 154 and a data field 156, among others. Fields 152 and 154 are preferably loaded with the predefined or dynamically agreed-upon port numbers for the particular transport layer protocol (e.g. TCP, the User Datagram Protocol (UDP), etc.) that is being utilized by the respective entities.

To measure the latency of a specific network path, a host could use the IP source routing option described above. In particular, the host could generate an IP message containing a source routing option (preferably strict) that specifies all of the layer 3 devices along the path of the interest. The host would then time stamp and transmit the message. Since the message is constrained to follow the specified path, by virtue of the source routing option, the time it takes for the message to go from the host to the destination is the latency of that path. Unfortunately, there is a substantial drawback of this approach.

Modern layer 3 devices typically include both a routing processor and a switching processor. The routing processor is utilized to perform high level route processing functions on received messages, such as identifying the best path for use in forwarding the messages, and other functions. The routing processor typically stores the received messages in a temporary buffer or register while these functions are being performed. The switching processor, on the other hand, simply moves the received messages from an input router interface to an output router interface based on "shortcuts" derived from earlier decisions rendered by the routing processor. Because the switching processor moves traffic with simpler determinations than those performed by the routing processor, latency within the router or layer 3 device can be significantly reduced by moving traffic with just the switching processor.

To the extent network layer messages include one or more options, the messages must be evaluated by the routing processor since switching processors are generally not configured to process options. By examining the value of header length field 108, a switching processor can quickly determine whether or not a given message includes any options. If the length of an IP header 102, as reflected in header length field 108, is greater than 5 octets, the switching processor "knows" that it contains at least one option. In response, the switching processor passes the message to the routing processor for further processing. At the routing processor, the message is placed in a temporary buffer or register while the routing processor determines which options are included in the message and performs the specified functions. As a result, messages containing options typically suffer a higher latency than messages that carry no options.

This added latency for messages carrying source routing options renders the corresponding latency determinations inaccurate. That is, the latency experienced by a message having a source routing option is often greater than a message carrying no options, since the source routing option must be evaluated by the routing processor of each layer 3 device at which the message is received. Since most messages, including those generated by video and audio applications, do not include options, basing latency determinations on messages carrying source routing options leads to inaccurate results. Accordingly, a need exists for a mechanism to measure the latency of selected network path with greater accuracy.

It is an object of the present invention to provide a system and method for accurately measuring the latency of a selected path in a computer network.

Network Latency

The present invention is directed to measuring response time between end points in a computer network. FIG. 6 is a schematic block diagram of a conventional computer network that includes a local enterprise network coupled to a remote enterprise network via an Internet Service Provider (ISP) domain. The local and remote enterprise networks may comprise autonomous systems such as corporate intranets, where in the local enterprise network includes a source end station ESA and the remote enterprise network includes a destination end station ESB. The ISP domain includes a plurality of routers coupled together by a transmission control protocol/Internet protocol (TCP/IP) network cloud. As shown in FIG. 6, the ISP domain includes a source router 6-100 (SRC) and a destination router 6-102 (DSTN) bordering an IP network cloud 6-104 and interconnected thereto by associated edge routers 6-103 and 6-105.

During operation, a user of source end station A (ESA) 6-106 may realize delays when communicating with destination end station B (ESB) 6-108 over the ISP domain. The delays may occur in the local enterprise network, the remote enterprise network or at the intermediate ISP domain. Typically, the user will levy a complaint to the Internet service provider and it would desirable for the Internet service provider to diagnose its domain and unequivocally determine whether it is the source of the delays.

Typically, an Internet Control Message Protocol (ICMP) is used to measure response time between end points, such as the source router and destination router, in the ISP domain. The ICMP is described generally on pages 185-189 of the textbook Interconnections by Radia Perlman, Addison Wesley Longman, Inc., 1992. In addition, the industry standards hand out entitled "standard RFC 792" describes the Internet Control Message Protocol in detail. The basic format of an ICMP message consists of one byte of message type, one byte of code, two checksum bytes, two bytes of type-specific data, followed by the variable Internet header itself and 64 bits of the problem packet. ICMP message types include: 0=echo reply; 3=destination unreachable; 4=source quench; 5=redirect; 8=echo request; 11=time exceeded; 12=parameter problem; 13=timestamp request; 14=timestamp reply; 15=information request; 16=information reply; 17=address mask request; and 18=address mask reply. The ICMP code message includes: (where type is time exceeded) 0=died in transit and 1=died while being reassembled at the destination; or (where type is destination unreachable) 0=network unreachable; 1=host unreachable; 2=protocol unreachable; 3=port unreachable; 4=fragmentation required but not allowed; and 5=source failed; or (where type is parameter problem) code unused.

The timestamp process entails the request and transmission of time data associated with message receipt. For example, an originate timestamp message is put in by the requester to indicate the most recent known time before transmission of the timestamp request. A receive timestamp message is put in by the replier to indicate the time that the request was received. A transmit timestamp message is put in by the replier to indicate the time at which the reply was transmitted.

The particular type of ICMP message used to measure response time is the echo request (message type=8), which can be used to decide whether some destination is reachable. The destination receiving an echo request is supposed to respond with an echo reply (message type=0). The echo request is also known as a "Ping." To ping a network node means to send an echo request thereto. Ping message exchanges, and the ICMP protocol, are typically used to measure response time because that protocol and those messages are services readily available to all devices in a TCP/IP network. That is, ICMP is an integral part of the Internet Protocol (IP) and implemented by every IP module in any IP device. Ping is an operation based on ICMP, and thus, is available on all machines. Therefore, Ping messages are typically used to measure response time in an ISP domain in response to customer complaints with respect to service.

A disadvantage associated with the use of Ping messages as a means for measuring network response time in the ISP domain is that the ICMP is not representative of the client's application protocol that manifests the latencies/delays. For example, the customer may be running a Domain Name Service (DNS) or a Simple Network Management Protocol (SNMP) application when they latencies manifest. These application protocols typically run over a transport such as the User Datagram Protocol (UDP). Another application may be the Hypertext Transfer Protocol (HTTP) that generally runs over the Transmission Control Protocol (TCP) transport of the Internet Protocol (IP) stack. In general, there are more latencies associated with the UDP and TCP protocol communications because of the processing required in the end points when implementing such features as quality of service (QOS). Therefore, it is desirable to measure the response time between router end points in the ISP domain using a protocol that is similar to the protocol used by a customer, such as UDP or TCP.

When using these transport protocols to communicate with a destination, the source end station generally specifies a particular port in the destination for receiving and responding to a request from the source. In order to effect such transport protocol communication, certain software processes must be running on the destination end station. Typically, the destination end station is a server located in the remote enterprise network and the source end station is a client located in the local enterprise network. The software running on the server that is required to effect transport communication is typically a server process (otherwise known as a responder) that is configured to "listen" on a particular port in order to receive requests from the client. For example, in the case of a DNS application running over EDP, the DNS server process running on a destination end station listens on standard router Port 53 in order to service any DNS requests.

The responder server processes are generally not running on the destination in source routers in the ISP domain. Yet in order for the Internet Service Provider to accurately diagnose the response time in its domain, it is desired for the ISP to emulate the UDP transaction between the source and destination routers in the ISP domain. That way, the ISP can determine whether there is any latencies between the source and destination router end points that are configured to utilize the same protocol, quality of service and ports as the client and server end stations on the local and remote enterprise networks. Accordingly, the server process software must be installed on the destination router so that the destination router can respond to the service request using the UDP transport protocol. More specifically, if the client is having a problem on, for example, Port 53, it is desirable to emulate Port 53 on the destination of the ISP domain. The server process (responder software) must be running and listening on Port 53 in the destination router in order to respond to the UDP request from the source router in the ISP domain.

A problem with manually configuring the routers with the appropriate software is that these processes would be constantly running in the routers for an extended period of time; this could lead to disruption of service (denial of service attacks) on the routers by unauthorized interlopers, e.g. "hackers." The present invention is directed to solving this problem and, in particular, to a technique for dynamically invoking a responder process on a destination router of the ISP domain.

SUMMARY OF THE INVENTION

Briefly, the present invention is directed to a system and method for accurately determining the latency of a selected path in a computer network. According to the invention, a setup or signaling protocol is modified in a novel manner so as to establish a path reservation state at each intermediary node along the selected path. The path reservation state, moreover, is associated with a given traffic flow having predefined parameters. As part of the path reservation state, each intermediary node also creates a short-cut at its switching processor for forwarding messages matching the given traffic flow to the next node along the selected path. Once the path setup process is complete, a first entity or source time stamps and transmits a test message to a second entity or receiver. The test message is configured in accordance with the predefined traffic flow parameters, but does not include a source routing or any other option. Due to the previously established path reservation state at each node, the message is identified as matching the given traffic flow, and in response, is forwarded along the selected path by the intermediary nodes without incurring any route processing delays. Upon receipt of the test message at the receiver, it is preferably returned to the source in a similar manner. By comparing the time at which the test message is returned with the time stamp contained in the message, an accurate latency of the selected path can be determined. In the preferred embodiment, the setup or signaling protocol utilized by the present invention is the Resource reSerVation Protocol (RSVP).

Network Latency

The present invention is directed to a control mechanism that enables a destination router to authenticate response time requests issued by a source router before providing the requests to service software for processing. The control mechanism comprises a Network Endpoint Control Protocol (NECP) message format that is exchanged between the source and destination routers when measuring response time throughout the network. The NECP message format encapsulates a Command Length Status Data (CLSD) message that actually holds the response time requests.

Specifically, a NECP control protocol message is generated by a "client" source router and transmitted to a "server" destination end router to, among other goals, begin listening on a particular port. For purposes of the present invention, the source router entity is called a "collector" and the destination router entity is called a "responder." Preferably, there are responder "daemon" processes running in various routers of the ISP domain, e.g. all edge routers. Broadly stated, the collector issues an NECP control message to the responder, instructing the responder to listen on a particular port (e.g. Port #53). The control message also includes a request for the responder to initiate a server process running the UDP protocol and, of course listening on Port 53. Note that there is a default port that the responder is initially configured to listen on to receive the NECP control message. In the illustrative embodiment described herein, the default port is referred to as a "responder port" and has a port number 1967. If there is a responder configured on the destination router, the responder receives the control message request and starts up a UDP server process configured to listen on Port 53. The client request may further specify a time interval (e.g. 30 seconds), within which the UDP port will be enabled. That is, the novel protocol enables specification of a discrete time period during which the UDP server is running on a particular port to thereby obviate misuse by intruders. Furthermore, in order to insure authentication of the message exchange, the entire NECP control message may be converted into a secure form using a particular encryption, scrambling or hashing algorithm—for example, the conventional MD5 hashing checksum algorithm. According to the invention, such encryption is optional. Therefore, an encryption enabler function is provided to configure the responder for receiving encrypted messages. If it is so enabled, the responder port is pre-configured with an appropriate key to decrypt/verify the message according to the MD5 algorithm.

Note that the control message can specify either a UDP port or a TCP port on which the responder should listen. In the case of a UDP port request from the collector, the responder replies with the UDP (probe entering packet returned to the collector). If the request is to listen on a TCP port, the responder accepts the incoming TCP connection. Note also that if the encryption authentication mechanism is not enabled, the responder will utilize conventional Access Control Lists (ACL) in, for example, look-up table format, to determine whether or not a particular client is authorized to transmit on the port 1967. In addition, the specified time interval within the control message should be sufficient to enable response time measurements between the collector and responder.

In summary, a collector will issue a novel control message to a responder over a default responder port in accordance with the present invention. If the responder is enabled for encryption communication, it will decrypt the control message according to the specified key and algorithm. If the responder is not so configured, it will check a conventional ACL to determine whether the client is authorized to communicate with the server. If the client is authorized or if the message is successfully decrypted, the responder interprets the message as instructions for starting up a particular port according to a particular protocol (TCP or UDP) and for a specified time period. The responder then responds to the collector in a manner dependent upon the particular protocol. In the case of a request to enable a UDP port for a particular time period, the responder, processes a request and then sends back an acknowledgment to the collector. The collector receives the acknowledgment and then sends out a UDP probe packet to the responder. The responder then "echoes" the packet back to the collector, which keeps the result. In the case of enabling a TCP port connection, instead of sending a UDP probe packet, the collector sends a TCP connect probe packet to establish a TCP connection to the destination router. A TCP connect probe measures the time for the connection to be established and completed, and essentially, measures "virtual circuit" availability. In either case, the responder disables the port after it replies to the probe packet. In addition, the responder disables the port when the response period expires. The disabling feature of the present invention is a security measure intended to prevent unauthorized use of a responder port.

BRIEF DESCRIPTION OF THE DRAWINGS

The invention description below refers to the accompanying drawings, of which:

FIG. 7 is a block diagram of the novel Network Endpoint Control Protocol (NECP) control message applicable to the network of FIG. 6 according to this invention;

FIG. 8 is block diagram of a Command Length Status Data (CLSD) sub-message format in that forms part of the control data of the message of FIG. 7;

FIG. 9 is a block diagram of an Internet Protocol (ITP) packet including a User Datagram Protocol (UDP) header.

DETAILED DESCRIPTION OF AN ILLUSTRATIVE EMBODIMENT

Figure 2:
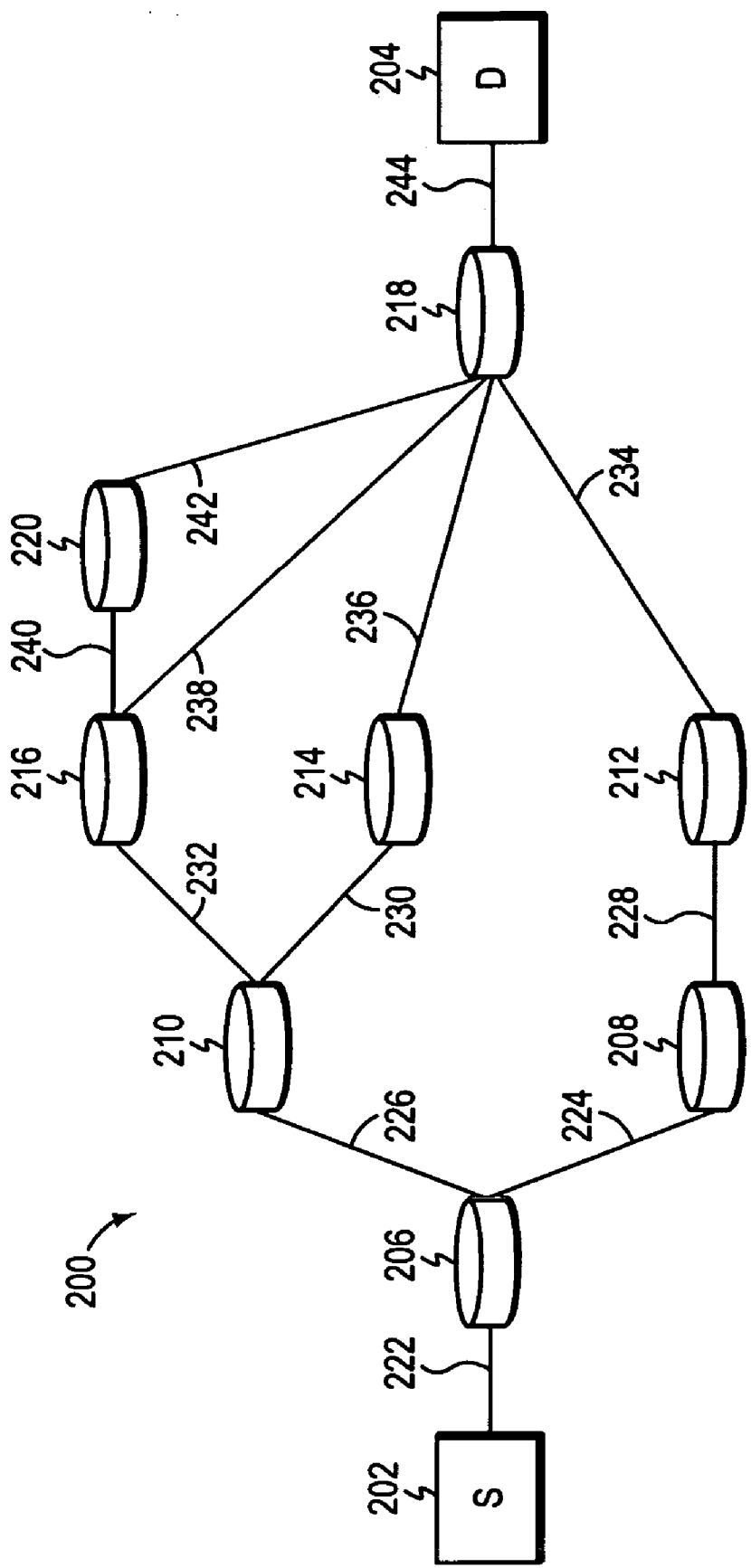
FIG. 2 is a highly schematic block diagram of a computer network.

FIG. 2 is a block diagram of a computer network 200. Network 200 includes a source entity 202 and a destination entity 204 interconnected by a plurality of layer 3 devices 206-220. In particular, source entity 202 is connected to layer 3 device 206 by link 222, and device 206, in turn, is connected layer 3 devices 208 and 210 by links 224 and 226, respectively. Device 208 is connected to layer 3 device 212 by link 228, and device 210 is connected to layer 3 devices 214 and 216 by links 230 and 232, respectively. Devices 212-216 are each connected to layer 3 device 218 by links 234, 236 and 238, respectively. Device 216 is also connected to layer 3 device 220 by link 240, and device 220 is connected to layer 3 device 218 by link 242. Layer 3 device 218 is connected to destination entity 204 by link 244.

As shown, network 200 defines a plurality of paths or routes between source entity 202 and destination entity 204. For example, a first path follows devices 206, 208, 212 and 218. A second path follows devices 206, 210, 214 and 218. A third path follows devices 206, 210, 216, 220 and 218. Messages transmitted from source entity 202 to destination entity 204 may follow any of these paths, among others. In particular, upon receipt of a message from source entity 202, device 206 will typically calculate the path to destination entity 202 that has the fewest number of "hops". Each layer 3 device basically represents a single hop. The fewest number of hops from device 206 to destination entity 204 is 3, and there are three different paths whose hop count is 3 (i.e., (1) devices 208, 212 and 218; (2) devices 210, 214 and 218, and (3) devices 210, 216 and 218). Accordingly, device 206 may select any one of these paths for forwarding messages from source entity 202 to destination entity 204.

Layer 3 devices, including device 206, typically do not take into consideration the various processing, memory and traffic management resources at individual routers of nodes in making its path determination. Thus, although two paths may have the same hop count, messages may experience reduced latency along one path because of greater processing, memory and/or traffic management resources within the nodes of that path and/or faster transmitting capabilities of the respective links. A service provider or network administrator may be interested in determining the latency experienced by messages following different paths having the same hop count.

It should be understood that the configuration of network 200 is for illustrative purposes only, and that the present invention will operate with other, possibly far more complex, network designs or topologies.

Figure 3A:
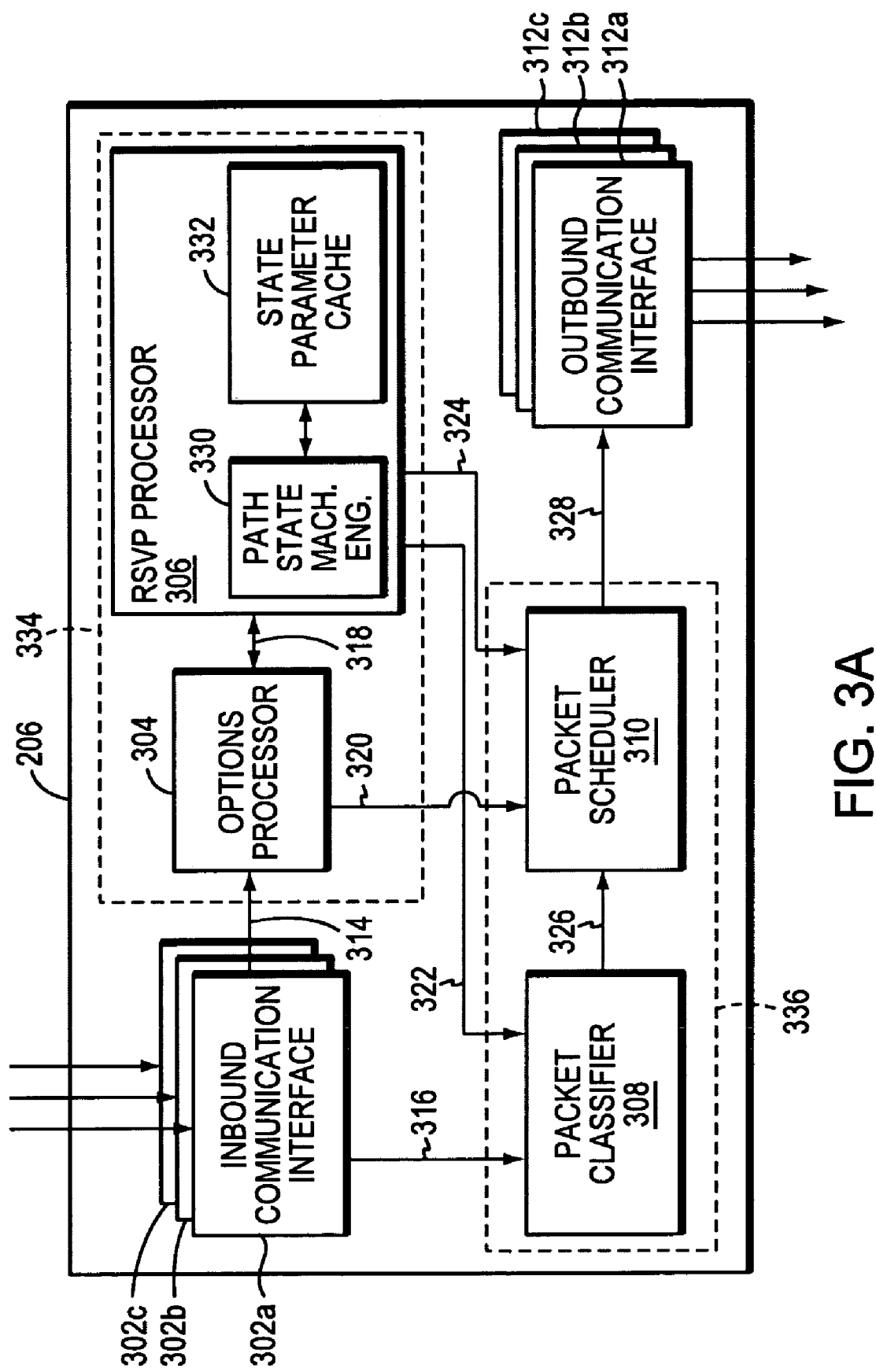
FIGS. 3A and 3B are highly schematic, partial functional diagrams of a network node and a network entity in accordance with the present invention.

FIG. 3A is a partial functional block diagram of layer 3 device 206 configured in accordance with the present invention. Device 206 includes a plurality of components, including a plurality of inbound communication interfaces 302a-c, an options processor 304, a Resource reSerVation Protocol (RSVP) processor 306, a packet classifier 308, a packet scheduler 310, and a plurality of outbound communication interfaces 312a-c. The inbound communication interfaces 302a-c, moreover, are in communicating relationship with both the options processor 304 and the packet classifier 308, as indicated by arrows 314 and 316, respectively. The options processor 304 is in communicating relationship with the RSVP processor 306 and the packet scheduler 310, as indicated by arrows 318 and 320, respectively. The RSVP processor 306, in turn, is in communicating relationship with the packet classifier 308 and the packet scheduler 310, as indicated by arrows 322 and 324, respectively. In addition, the packet classifier 308 is in communicating relationship with the scheduler 310, as shown by arrow 326, and scheduler 310 is in communicating relationship with the outbound-communication interfaces 312a-c, as shown by arrow 328.

Messages, including packets or frames, received by layer 3 device 206 are captured by one of the inbound communication interfaces 302a-c and passed to one or more components for processing. For example, if the received packets contain one or more options, inbound communication interface 302 hands them to the options processor 304, which may be configured to implement the desired option. If no options are present, inbound communication interface 302 preferably hands the packets to packet classifier 308. Packet classifier 308 is configured to inspect multiple fields of received packets so as to determine whether the packets match any previously established traffic flows, and thus the service, if any, that is to be accorded to the packets. Packet scheduler 310, in addition to directing packets to the appropriate outbound interface 312a-c for forwarding, is configured to apply one or more traffic management mechanisms (such as Weighted Fair Queuing) to ensure that the packets are forwarded in time to satisfy the particular service to which they are entitled.

RSVP processor 306 also includes a plurality of sub-components. In particular, RSVP processor 306 includes at least one path state machine engine 330 that is operatively coupled to a state parameter cache or memory device 332. As described below, path state machine engine 330, in cooperation with state parameter cache 332, maintains the path state established by the source entity 202 and destination entity 204 for a predefined traffic flow so that an accurate latency may be determined relative to the selected path. In addition, RSVP processor 306 directs the packet classifier 308 to look for packets matching the predefined traffic flow, and directs packet scheduler 310 to apply a particular traffic management mechanism to packets that match that flow. The options processor 304 and RSVP processor are facilities implemented by a routing processor at device 206 as indicated by dashed block 334. In contrast, the packet classifier 308 and packet scheduler 310 are facilities implemented by a switching processor as indicated by dashed block 336. Those skilled in the art will understand that routing and switching processors 330, 332 may include additional facilities and/or functions.

In the preferred embodiment, a single communication interface provides both inbound and outbound message receiving and forwarding services. That is, layer 3 device 206 simply includes a set of interfaces through which messages may be received and forwarded. However, to facilitate the present discussion, the communication interfaces have been segregated into inbound and outbound portions, as described above.

It should also be understood that each interface at a layer 3 device is typically assigned a separate IP address, since each interface is often coupled to a different subnetwork of network 200.

A suitable platform for layer 3 devices 206-220 are the 7500r series of routers or the Catalyst 8500r series of switch routers both from Cisco Systems, Inc. of San Jose, Calif.

Figure 3B:
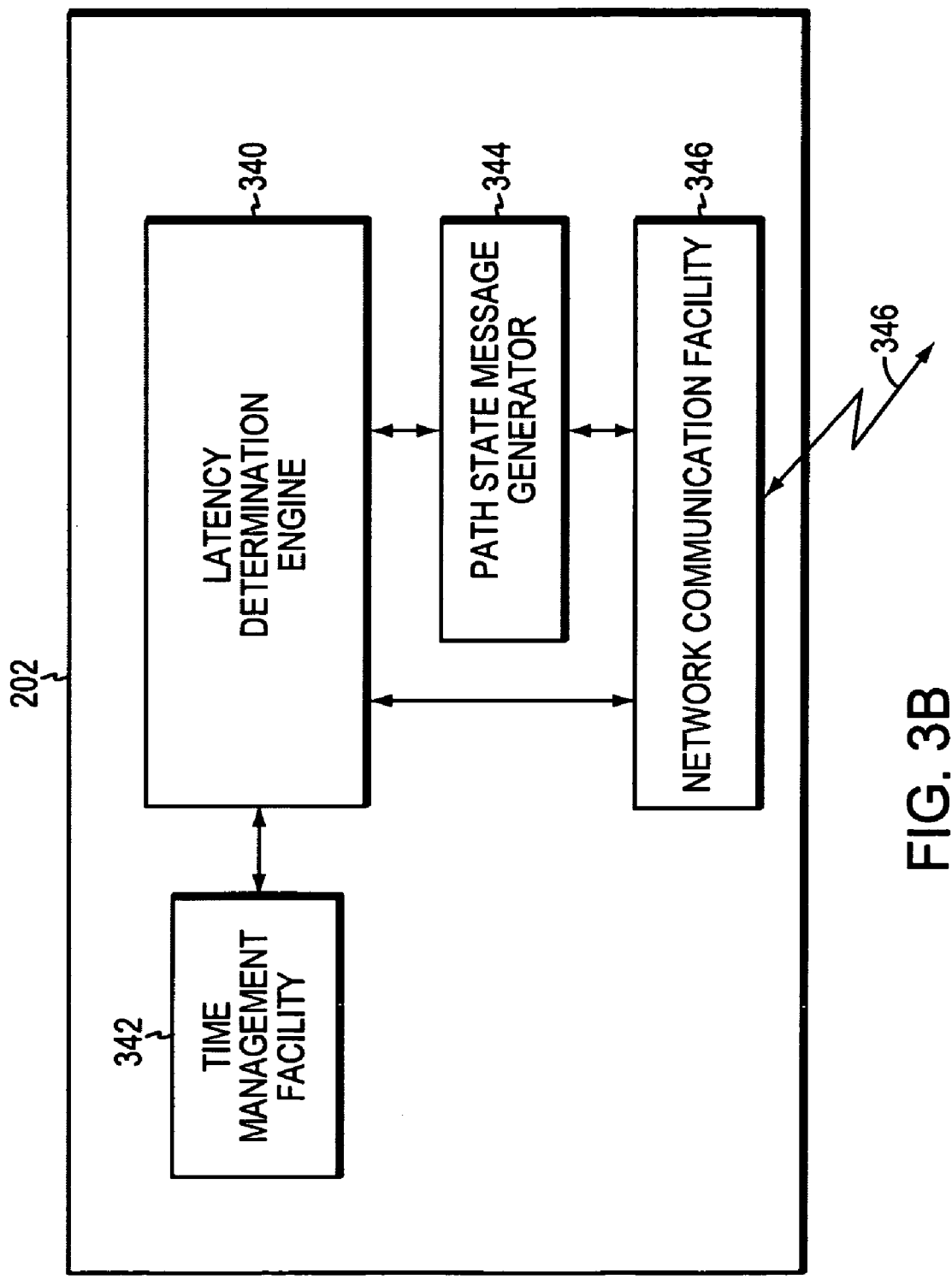

FIG. 3B is a highly schematic, partial functional diagram of a network entity, such as source entity 202. The source entity 202 includes a latency determination engine 340 that is coupled to a time management facility 342 and to a path state message generator 344. The latency determination engine 340 and path state message generator 344 are also in communicating relationship with a network communication facility 346. The network communication facility 346 provides connectivity to the computer network 200 (FIG. 2) as shown by arrow 348. The network communication facility 346 may include conventional hardware and software components to support network communication in accordance with the Transmission Control Protocol/Internet Protocol (TCP/IP) Reference Model.

Suitable platforms for the source and destination entities 202, 204 include any Intel x86/Windows or Unix-based computers or a router.

Routing processor 334, including options processor 304 and RSVP processor 306, and switching processor 336, including packet classifier 308 and packet scheduler 310, at network node 206 (FIG. 3A), as well as latency determination engine 340 and path state message generator 344, at source entity 202 (FIG. 3B), preferably comprise programmed or programmable processing elements containing software programs pertaining to the methods and functions described herein, and which may be executed by the processing elements. Other computer readable media may also be used to store and execute the program instructions.

As indicated above, a service provider or network administrator may wish to accurately determine the latency of a selected path of network 200. In accordance with the present invention, a path reservation state is first established at each layer 3 device included within the selected path. The path reservation state is preferably established through a setup or signaling protocol modified as described below. Once the path reservation state is established, a test message carrying a time stamp is transmitted. By virtue of the pre-established path reservation state, the test message follows the selected path without having to include a source routing option. As a result, the service provider or network administrator obtains a more accurate latency measurement. In other words, the latency measured by the present invention more closely approximates the "true" latency experienced by conventional data packets following the selected path.

In the preferred embodiment, the setup or signaling protocol used to establish the path reservation states is the Resource reSerVation Protocol (RSVP) as set forth in Request for Comments (RFC) 2205 from the Network Working Group of the Internet Engineering Task Force (IETF), which is hereby incorporated by reference in its entirety. RSVP is a well-known signaling protocol that was developed so that entities (typically referred to as receivers) could reserve bandwidth within their computer networks to receive a desired traffic flow from one or more sourcing entities. The traffic flows to which RSVP is typically applied include highly bandwidth-sensitive programs, such as a multimedia broadcasts, videoconferences, audio transmissions, etc. Pursuant to RSVP, sources send RSVP Path messages identifying themselves and indicating the bandwidth needed to receive their programming. If a receiver is interested in the programming offered by a particular source, it sends a RSVP Reservation (Resv) message, which travels hop-by-hop, back to the source. At each hop, the corresponding router establishes a session for the receiver, and sets aside the requested bandwidth for the desired traffic flow. With RSVP, neither the source nor the receiver specifies the particular network path along which the traffic flow is to be routed. Instead, the path is dynamically determined by the layer 3 devices in a conventional manner through application of their routing protocols.

Path Reservation State Setup

Referring to FIG. 2, suppose that the service provider or network administrator wishes to measure the latency from source 202 to destination 204 along the selected network path that includes layer 3 devices 206, 210, 214 and 218. The service provider or network administrator preferably directs the latency determination engine 340 (FIG. 3B) at source entity 202 to establish a path state at each layer 3 device along the selected path (i.e., at devices 206, 210, 214 and 218). In response, the latency determination engine 340 directs path state message generator 344 to formulate and transmit via network communication facility 346 a path state setup message.

Figure 4:
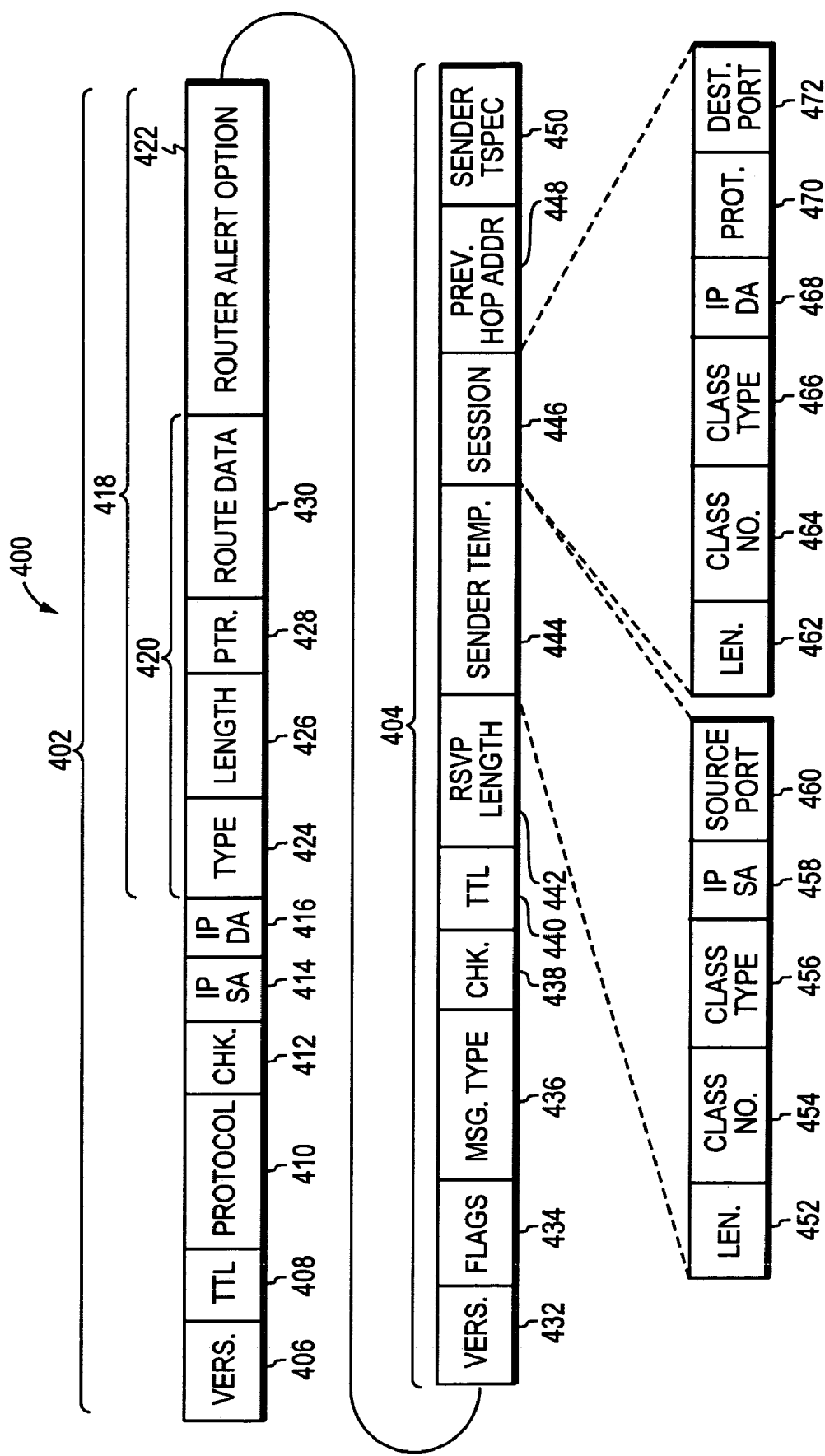
FIG. 4 is a block diagram of a first path state message in accordance with the present invention.

FIG. 4 is a block diagram of a preferred path state setup message 400. The path state setup message 400, which preferably complies with version 4 of the IP protocol, includes an IP header 402 followed by a path message area 404. The IP header 402 includes a plurality of fields, such as a version field 406, a time to live (TTL) field 408, a protocol field 410, a checksum field 412, an IP source address (SA) field 414, and an IP destination address (DA) field 416, among others. Latency determination engine 340 preferably directs path state message generator 344 to load the IP SA field 414 with its own IP address and the IP DA field 416 with the IP address of destination entity 204. Those skilled in the art will understand that IP header 402 also includes additional fields, which are preferably loaded by source entity 202 in a conventional manner.

Unlike conventional RSVP Path messages, latency determination engine 340 directs the message generator 344 to insert at least two options in an options area 418 following the IP DA field 416 of the IP header 402. In particular, message generator 344 preferably inserts both a source routing option 420 and a router alert option 422 into the options area 418. The source routing option 420, which may be in accordance with either strict or loose source routing, includes a type field 424, a length field 426, a pointer field 428 and a route data field 430. Within route data field 430, latency determination engine 340 directs message generator 344 to enter in sequential order the IP address for the respective interfaces of each layer 3 device 206, 210, 214 and 218 along the selected path. Latency determination engine 340 may be manually provided with these IP addresses by the service provider or network administrator, or it may discover these IP addresses automatically. For example, latency determination engine 340 generate and send one or more packets to destination entity 204 carrying the well-known record route option of the IP protocol. As described below, by including a source routing option 420 in path state setup message 400, the latency determination engine 340 at source entity 202 constrains the path state setup message 400 to follow the selected path. Consequently, path states are only established at the layer 3 devices along the selected path.

As mentioned above, path state setup message 400 preferably includes the router alert option 422 as specified by the RSVP protocol. The router alert option 422, which is described in RFC 2113, basically directs each layer 3 device, upon receipt of message 400, to examine the message's contents, even though the message is not addressed to the receiving layer 3 device.

Path message area 404 also includes a plurality of fields, which, in the preferred embodiment, are similar to the fields of an RSVP Path message. In particular, path message area 404 includes a version field 432 specifying the version of the RSVP protocol being utilized, a flags field 434 which are, as of yet, undefined, a message type field 436, which is preferably set to "1" to indicate that message area 404 is to be treated like an RSVP Path message, a checksum field 438, a time to live (TTL) field 440 that is similar to TTL field 408, and an RSVP message length field 442 that specifies the length of path message area 404. Path message area 404 also includes a sender template object 444 and a session object 446. As described in detail below, a previous hop field 448 will be added to the path message area 404 of message 400 by the first layer 3 device along the selected path of network 200 (FIG. 2) (i.e., device 210). As generated by message generator 344, however, message area 402 does not include a previous hop field 448. Although path message area 404 may include a sender traffic specifier (tspec) field 450, in the preferred embodiment it is omitted.

The sender template object 444 is used to specify the source of the path state setup message 400, and the session object 446 is used to specify the destination of the anticipated traffic flow. As described below, layer 3 devices along the selected path utilize the contents of the sender template object 444 and the session 446 to set their respective packet classifiers so as to identify the particular traffic flow to which message 400 pertains. The sender template object 444 and session object 446 each include a plurality of fields. In particular, the sender template object 444 includes a length field 452, a class number field 454, a class type field 456, an IP SA field 458 and a source port field 460. Fields 452-456 are preferably loaded in accordance with the RSVP specification for sender template objects. Latency determination engine 340 preferably directs the message generator 344 to load IP SA field 458 with the IP address for source entity 202 and to de-assert source port field 460 to indicate that engine 340 is not using a transport layer port number.

The session object 446 similarly includes a length field 462, a class number field 464, a class type field 466, an IP DA field 468, a protocol field 470 and a destination port field 472.

Again, fields 462-466 are preferably loaded in accordance with the RSVP specification for session objects. IP DA field 468 is loaded with the IP address of destination entity 204 (FIG. 2), protocol field 470 preferably specifies the IP protocol of the anticipated data flow, which typically corresponds to the contents of protocol field 410 of IP header 402. Destination port field 472 contains the transport layer port to which message area 404 should be passed at destination entity 204. The contents of field 472 may also be de-asserted. Furthermore, if path message area 404 includes a sender tspec object 450, its contents (other than the corresponding length, class number, and class type fields) are also preferably de-asserted. By de-asserting the sender tspec object 450, source entity 202 stops layer 3 devices along the selected path from pre-reserving any bandwidth for the identified traffic flow.

To the extent source and destination ports are used by entities 202 and 204, the port numbers are preferably selected in accordance with commonly owned and U.S. patent application Ser. No. 09/346,080 filed on Jul. 1, 1999, now issued as U.S. Pat. No. 6,662,223 on Dec. 9, 2003, the text of which is written herein, and entitled Protocol to Coordinate Network End Points to Measure Network Latency, which is hereby incorporated by reference in its entirety.

After generating path state setup message 400, latency determination engine 340 preferably directs the message generator 344 to transmit it into the network 200 (FIG. 2) via network communication facility 346. Message 400 is first received by the layer 3 device to which source entity 202 is directly coupled (i.e., layer 3 device 206). In particular, message 400 is captured by, one of the inbound communication interfaces 302a-c (FIG. 3), which determines that message 400 carries options area 418, including router alert option 422, and therefore should be further processed by device 206. Accordingly, the inbound interface 302 passes message 400 to the options processor 304, which examines options area 418 and determines that it includes source routing option 420 as well as router alert option 422. In response to the detection of router alert option 422, options processor 304 examines that portion of message 400 following the IP header 402 (i.e., path message area 404). Options processor 304 is preferably configured to recognize path message area 404 as being an RSVP message, and, in response, passes message 400, including source routing option 420, to the RSVP processor 306 for additional processing. Due to the presence of the source routing option 420, options processor 304 also instructs the RSVP processor 306 to return message 400 to it after RSVP processor 306 completes its processing so that the options processor 304 may implement the source routing option 420 of the message 400.

RSVP processor 306 preferably examines the contents of path message area 404, and, based on the contents of message type field 436, recognizes this message 400 as an RSVP path message. In response, RSVP processor 306 directs path state machine engine 330 to initialize, but not yet establish, a corresponding path reservation state. In response, state machine engine 330 stores the IP address of the previous hop router from which it received message 400, as provided in previous hop address field 448, as well as the information from the sender template object 444 and the session object 446. Since layer 3 device 206 is the first hop device, path message area 404 does not include a previous hop address field 448. Accordingly, in this instance, the state machine engine 330 simply stores the IP address of source entity 202 and its source port from fields 458 and 460, and the IP address of destination entity 204, its protocol and destination port from fields 468, 470 and 472 at state parameter cache 332.

RSVP processor 306 then adds a previous hop address field 448 to path message area 404 and enters the IP address corresponding to its outbound communication interface 312 through which message 400 will be sent to reach the next layer 3 device (i.e., device 310) into field 448. RSVP processor 306 preferably determines the address to load into previous hop address field 448 through cooperation with options processor 304, which is evaluating the source routing option 420. Next, RSVP processor 306 returns message 400 to the options processor 304 so that it may complete implementation of the source routing option 420. Specifically, options processor 304 examines the pointer field 428 and the router data field 430 of source routing option 420, and concludes that message 400 should be forwarded to layer 3 device 210. Accordingly, options processor 304 passes the message 400 to packet scheduler 310 with instructions to forward it to layer 3 device 210. Options processor 304 also increments the pointer of field 428 so that it points to the IP address of the next layer 3 device in the route data field 430 (i.e., layer 3 device 214). Those skilled in the art will understand the layer 3 device 206 will also decrement the TTL fields 408 and 440, recalculate the checksums for fields 412 and 438, and perform other conventional layer 3 processing, as required. Packet scheduler 310 forwards the message 400 from the outbound communication interface 312 used to reach layer 3 device 210. It will be understood that, in the absence of source routing option 420, layer 3 device 206 might just as easily forward message 400 to layer 3 device 208.

Message 400 is next received at layer 3 device 210 which performs similar processing to the message. In particular, layer 3 device 210 establishes a pre-reservation state at its state machine engine based on the parameters in the sender template object 444 and session object 446. Since message 400 as received at layer 3 device 210 now includes a previous hop address field 448, device 210 also stores this information in its respective state parameter cache for this pre-reservation state. Based on the contents of the pointer field 428 and the route data field 430 of source routing option 420, the options processor at device 210 determines that the next device to which message 400 is to be routed is layer 3 device 214. Before forwarding message 400, the RSVP processor of device 210 replaces the contents of the previous hop address field 448 with the IP address associated with its outbound interface through which message 400 will be forwarded in order to reach layer 3 device 214. Device 210 also adjusts the pointer within field 428 to point to the IP address of the next layer 3 device in the route data field 430 (i.e., layer 3 device 218). This process is repeated at the remaining layer 3 devices along the selected path (i.e., devices 214 and 218). In particular, devices 214 and 218 also initialize a path reservation state based on the contents of the sender template object 444, session object 446 and previous hop address field 448.

From layer 3 device 218, message 400 is forwarded to destination entity 204. Destination entity 204 preferably includes a latency determination engine that is also configured to recognize message 400 as a path state setup message from source entity 202, and that source entity 202 is seeking to establish a path state in order to calculate the latency of the selected path. In response, the latency determination engine at destination entity 204 preferably directs its path state message generator to formulate a path state reservation message for forwarding hop-by-hop along the selected path back to source entity 202. The path state reservation message is used to establish (e.g., confirm) the path reservation states previously initialized by the respective state machine engines of devices 206, 210, 214, and 218.

Figure 5:
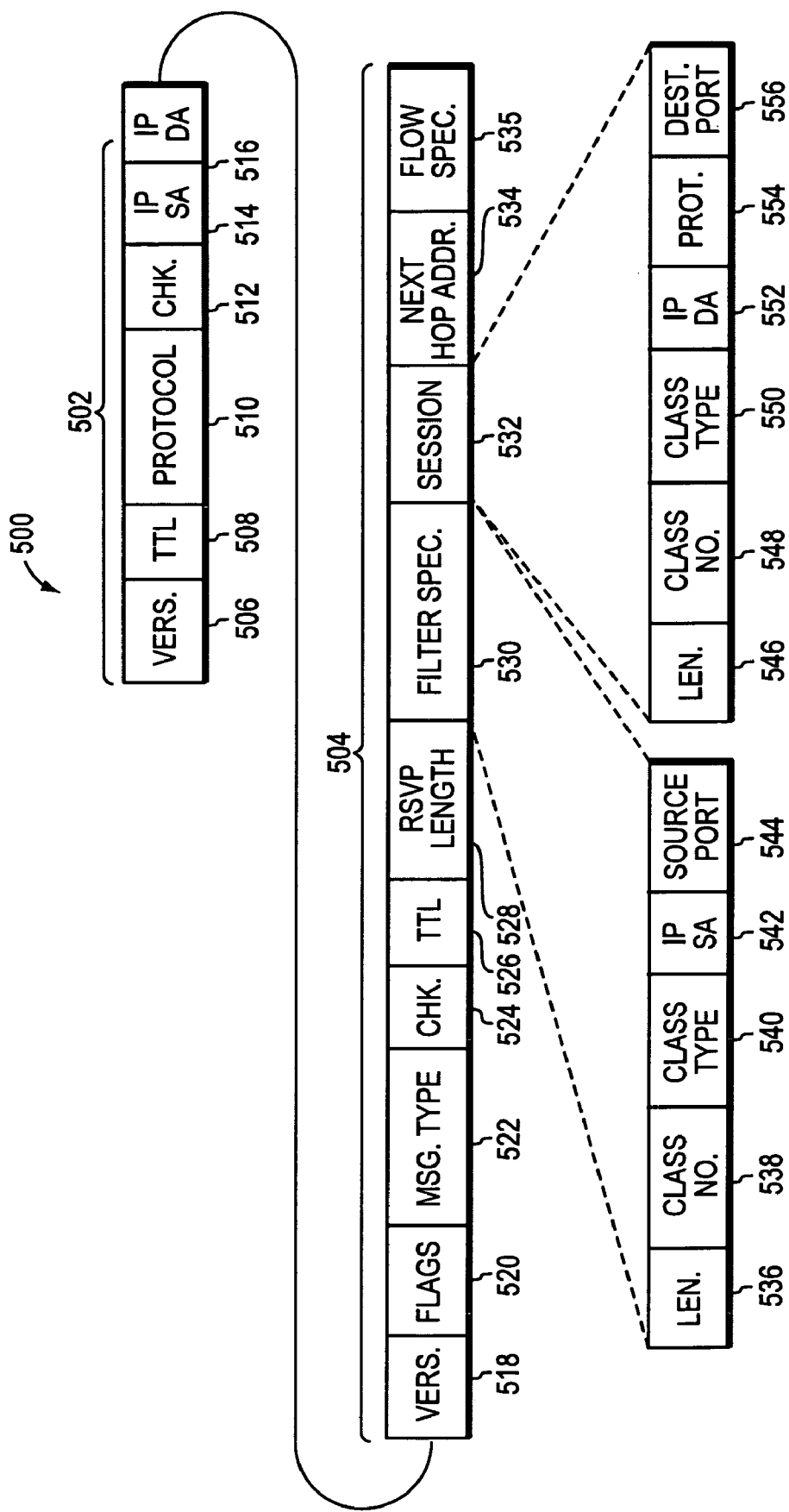
FIG. 5 is a block diagram of a second path state message in accordance with the present invention.

FIG. 5 is a block diagram of a preferred path state reservation message 500 as formulated by destination entity 204. The path state reservation message 500, which preferably complies with version 4 of the IP protocol, includes an IP header 502 followed by a reservation message area 504. The IP header 502 includes a plurality of fields including a version field 506, a time to live (TTL) field 508, a protocol field 510, a checksum field 512, an IP SA field 514 and an IP DA field 516. Destination entity 204 preferably loads fields 506-512 in a conventional manner and enters its own IP address in the IP SA field 514. Since the path state reservation message 500 is to be returned to source entity 202 hop-by-hop, destination entity 204 preferably loads the IP DA field 516 with the IP address of the first hop (i.e., the IP address for layer 3 device 218). Destination entity 204 derives the IP address of the first hop from the contents of the previous hop address field 448 of the path state message 400 that it received. As explained above, before forwarding path state message 400 to destination entity 204, the last hop along the selected path (i.e., layer 3 device 218) placed its own IP address (corresponding to the interface used to reach destination entity 204) in the previous hop address field 448. This IP address is copied by destination entity 204 into the IP DA field 516 of the path state reservation message 500. As shown, the IP header 502 of the path state reservation message 500 preferably does not include any options.

The reservation message area 504 also includes a plurality of fields, which, in the preferred embodiment, are similar to the fields of an RSVP Resv message. In particular, reservation message area 504 includes a version field 518 specifying the version of the RSVP protocol being utilized, a flags field 520, which are, as of yet, undefined, a message type field 522, which is preferably set to "2" to indicate that message area 504 is to be treated basically as an RSVP Resv message, a checksum field 524, a time to live (TTL) field 526 that is similar to TTL field 508, and an RSVP message length field 528 that specifies the length of reservation message area 504. Reservation message area 504 further includes a filter specification (spec) object 530, a session object 532, and a next hop address field 534. Although message area 504 may include a flow specification (spec) object 535, in the preferred embodiment it is omitted. Destination entity 204 loads the filter spec object 530 with information derived from the sender template object 444 of the path state setup message 400. In particular, destination entity 204 loads a length field 536, a class number field 538 and a class type field 540 as provided in the RSVP specification for filter spec objects. In an IP SA field 542 of the filter spec object 530, destination entity 204 loads the IP address of source entity 202, as provided in IP SA field 458 of the sender template object 444. In a source port field 544, destination entity 204 loads the source port, if any, being utilized by the source entity 202 for this traffic flow, as provided in the source port field 460 of the sender template object 444.

For the session object 532, destination entity 204 loads a length field 548, a class number field 548 and a class type field 550, as provided by the RSVP specification for session objects. In an IP DA field 552, destination entity 204 enters its own IP address. In a protocol field 554, destination entity 204 preferably specifies the network layer protocol of the anticipated data flow, which typically corresponds to the contents of protocol field 510 of IP header 502. A destination port field 556, which can be used to specify the transport layer protocol at destination entity 204, is preferably de-asserted. If a flow spec object 535 is included, its contents (other than the corresponding length, class number, and class type fields) are preferably de-asserted.

Upon formulating the path state reservation message 500, destination entity 204 forwards it to the first hop (i.e., layer 3 device 218) along the selected path, as specified in the IP DA field 516. At layer 3 device 218, the path state reservation message 500 is captured and passed to the respective RSVP processor for processing. The RSVP processor notes that the reservation message 500 corresponds to the earlier forwarded path state message 400. Accordingly, the RSVP processor directs its state machine engine to establish a path reservation state based on the earlier state that was initialized. Specifically, the RSVP processor up-dates the packet classifier at layer 3 device 218 in accordance with the information contained in the filter spec object 530 and the session object 532 of the received path state reservation message 500. More specifically, the RSVP processor at device 218 configures the packet classifier to look for messages, such as IP packets 100 and their corresponding transport layer packets 150 (FIGS. 1A and 1B), in which: (1) the IP SA field 126 has the IP address of source entity 202, as specified in field 542 of the filter spec object 530 of the received path state reservation message 500; (2) the IP DA field 128 has the IP address of destination entity 204, as specified in field 552 of the session object 532; (3) the protocol field 122 contains the transport layer protocol specified in field 554 of the session object 532; (4) the source port field 152 (FIG. 1B) contains the source port specified in source port field 544 of the filter spec object 530; and (5) the destination port field 154 (FIG. 1B) contains the destination port specified in the destination port field 556 of the session object 532.

The RSVP processor at device 218 also directs the respective packet scheduler to create a short-cut for messages matching the above-described criteria. Specifically, the RSVP processor instructs the packet scheduler to switch packets matching this traffic flow onto the outbound interface coupled to destination entity 204. A suitable mechanism for generating short-cuts is described in commonly owned and U.S. patent application Ser. No. 08/951,820, filed Oct. 14, 1997, now issued as U.S. Pat. No. 6,147,993 on Nov. 14, 2000 and entitled Method and Apparatus for Implementing Forwarding Decision Shortcuts at a Network Switch, which is hereby incorporated by reference in its entirety. As described above, path state reservation message 500 either does not include a flow spec object 535 or, if one is included, its contents are de-asserted. Accordingly, device 218 does not update its packet scheduler to apply a particular traffic management mechanism to packets matching the above mentioned criteria.

It should be understood that the RSVP processor at each layer 3 device along the selected path may need to be configured so as to accept and process path state reservation messages 500, even though they either lack a flow spec object 535 or include a flow spec object whose contents are de-asserted, unlike conventional RSVP Resv messages.

After up-dating the packet classifier and packet scheduler, the RSVP processor at device 218 either builds a new path state reservation message 500 or modifies the one received from destination entity 204 for delivery to the next upstream device (i.e., layer 3 device 214) along the selected path. In the IP DA field 516 of the new path state reservation message 500, device 218 enters the next upstream hop address as stored in its state parameter cache for this particular traffic flow. As described above, when device 218 received the path state setup message 400 as forwarded to it by device 214, the RSVP processor at device 218 stored the corresponding IP address of device 214 through which the message 400 was forwarded at the state parameter cache of device 218. This is the IP address that device 218 now uses in IP SA field 514 of the new path state reservation message 500. In IP DA field 516, the RSVP processor at device 218 enters the IP address associated with the outbound interface through which it will send message 500 to device 214. The RSVP processor copies the contents of the reservation message area 504 into the new path state reservation message 500 addressed to device 214. However, device 218 loads the next hop address field 534 of the new reservation message with the IP address associated with its outbound interface through which message 500 is forwarded. Thus, from the point of view of device 214, the next hop address field 534 will indeed contain the IP address of the next hop for this traffic flow.

Device 218 then sends this new path state reservation message 500 to layer 3 device 214, which represents the next upstream hop along the selected path. Device 214 processes the received path state reservation message 500 in a similar manner as described above in connection with device 218. That is, device 214 similarly directs its packet classifier to look for and identify packets matching the IP SA, IP DA, source port, destination port and protocol as specified in the filter spec object 530 and session object 532 of the received message 500. The RSVP processor at device 214 also directs its packet scheduler to create a short-cut for packets matching this traffic flow. Here, the short-cut forwards such matching packets to the outbound interface coupled to device 218 as provided in next hop address field 534 of the received path state reservations message 500 from device 218. Furthermore, since the received message 500 does not include any flow specifications, the RSVP processor at device 214 does not direct the packet scheduler to apply any particular traffic management mechanisms to matching packets. Device 214 also builds and sends a new path state reservation message 500 to the next upstream hop (i.e., layer 3 device 210).

This procedure is repeated at each of the remaining devices along the selected path. Device 206, moreover, builds and sends a path state reservation message 500 to source entity 202. By receiving a path state reservation 500 that corresponds to the path state setup message 400 that it sourced, the latency determination engine 340 (FIG. 3B) of source entity 202 "knows" that each of the devices 206, 210, 214, and 218 along the selected path have established a path state, and thus instructed their packet classifiers to detect the specific traffic flow between source entity 202 and destination entity 204, and to forward that traffic along the specified path (i.e., along devices 206, 210, 214, and 218).

In the preferred embodiment, destination entity 204 similarly formulates and sends to source entity 202 a path state setup message 400 having a source routing option 420 that lists the devices along the selected path (i.e., layer 3 devices 206, 210, 214 and 218) in reverse order. Destination entity 204 sends this message 400, which is processed hop-by-hop by each device along the selected path, as described above. The latency determination engine 340 of source entity 202 similarly directs the message generator 344 to formulate and send a path state reservation message 500, which is propagated, hop-by-hop, by each device (i.e., layer 3 devices 206, 210, 214 and 218) along the selected path until it is received at destination entity 204. Through the exchange and processing of path state setup messages 400 and path state reservation messages 500, as described above, path states are established at each device along the selected path and in both directions (i.e., from source 202 to destination 204 and from destination 204 to source 202). Thus, the packet classifiers at the layer 3 devices are now configured to look for a traffic flow from source entity 202 to destination entity 204, and the packet schedulers are configured to forward that traffic along the selected path. The packet classifiers are also configured to look for a traffic flow from destination entity 204 to source entity 202, and the packet schedulers are configured to forward that traffic along the selected path.

Latency Determination

Once the path states have been established within the devices along the selected path, source entity 202 preferably formulates and sends a test message to destination entity 204. In particular, latency determination engine 340 accesses time management facility 342 to create a time record or time stamp. Engine 340 places the time record into a test message and hands it down to the network communication facility 346 for transmission to destination entity 204. In the preferred embodiment, the format of the test message corresponds to the Network Endpoint Control Protocol (NECP), as described in previously referenced and incorporated U.S. patent application Ser. No. 09/346,080 now issued as U.S. Pat. No. 6,662,223 on Dec. 9, 2003 and entitled Protocol to Coordinate Network End Points to Measure Network Latency. The network communication facility 346 preferably encapsulates the test message containing the time record in a corresponding packet. For example, the network communication facility 346 may first create one or more transport layer packets similar to the TCP packet of FIG. 1B, placing the test message from engine 340 into the data field 156. In the source port field 152, latency determination engine 340 directs communication facility 346 to load the value used in the source port field 460 of the sender template object 444 from the path state setup message 400 described above. In the destination port field 154, communication facility 346 is directed to load the value used in the destination port field 472 of the session object 446 from the path state setup message 400. The transport layer packet is then passed down to the respective network layer where it may be encapsulated in a corresponding network layer packet, which, in the preferred embodiment, is preferably similar to IP packet 100 of FIG. 1A. Significantly, the test message utilized with the present invention does not include any options, thus there is no options area 130. In the IP SA field 126 of the test message, network communication facility 346 loads the IP address of source entity 202 (as utilized in the IP SA field 458 of the path state setup message 400), and, in the IP DA field 128, it loads the IP address of destination entity 204 (as utilized in the IP DA field 468 of the path state setup message 400). In the protocol field 122, communication facility 346 places the value, if any, previously utilized in the protocol field 470 from the path state setup message 400.

Communication facility 346 then transmits the test message to destination entity 204. Those skilled in the art will understand that the IP packet containing the time record may be encapsulated in additional messages by other layers of the protocol stack utilized by the network communication facility 346 of source entity 202. The test message is first received at layer 3 device 206, which is coupled to source entity 202. In particular, the message is received at an inbound communication interface 302, and, since, it does not contain any options, it is passed directly to the packet classifier 308. The packet classifier 308 examines the contents of the protocol field 122, the IP SA field 126, the IP DA field 128, and also recovers and examines the contents of the source port field 152 and the destination port field 154 of the corresponding transport layer packet, to determine whether those fields match any established traffic flows. Since the RSVP processor 306 previously configured the packet classifier 308 with this traffic flow, a match is detected. Packet classifier 308 then hands the message to the packet scheduler 310 and informs it of the match. Packet scheduler 310 determines that the appropriate disposition for this message, as previously directed by the RSVP processor 306, is to forward the message to layer 3 device 210. That is, packet scheduler 310 has been configured with a short-cut for forwarding such messages to layer 3 device 210. Packet scheduler 310 thus places the test message in the appropriate outbound communication interface 312 for forwarding to layer 3 device 210. Importantly, by virtue of the path state established at layer 3 device 206 for messages meeting these traffic flow criteria, it does not perform an independent routing decision for this message, which could possibly result in the message being forwarded to layer 3 device 208.

Figure 1A:
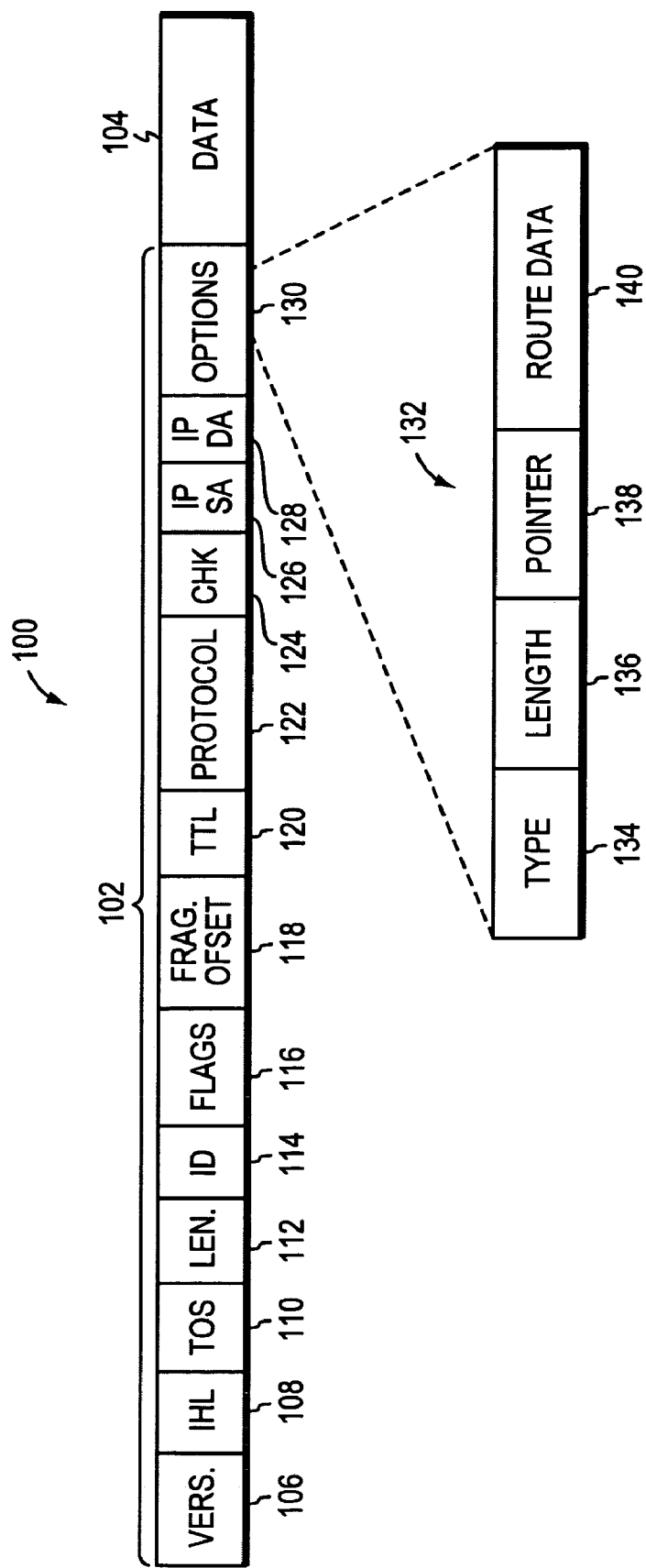
FIGS. 1A and 1B, previously discussed, are block diagrams of a network and transport layer messages.
Figure 1B:
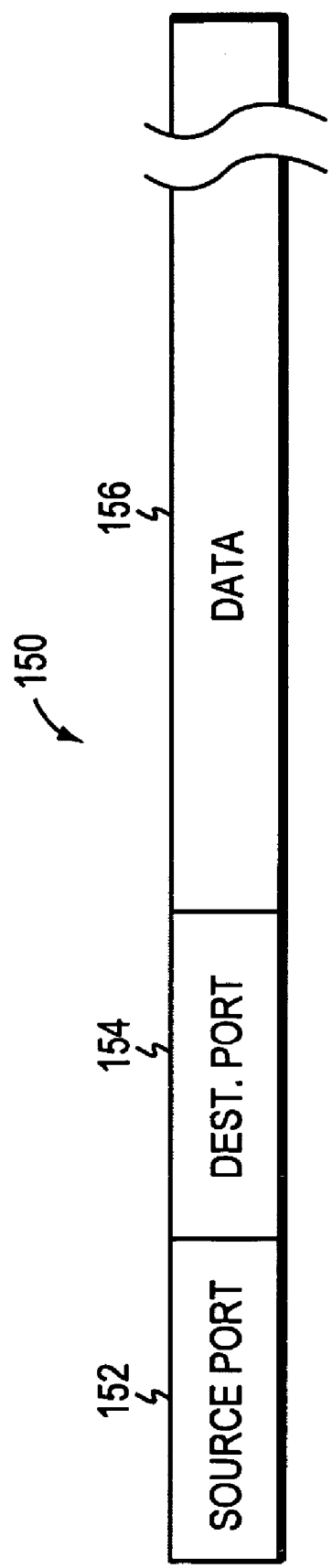

At layer 3 device 210 the same process occurs, resulting the message being forwarded to layer 3 device 214 by virtue of the path state established at device 210. From device 214, the test message is forwarded to device 218, which, in turn, forwards it to destination entity 204. The latency determination engine of destination entity 204 is preferably configured to return the test message to source entity 202. That is, destination entity 204 generates a second test message containing the time record received from source entity 202. The second test message is similarly handed down to the network communication facility for transmission. Here, the second test message may be encapsulated into a transport layer packet similar to packet 150 (FIG. 1B) with message (containing the time record) loaded into data field 156. The transport layer packet is encapsulated into one or more IP packets, similar to packet 100 (FIG. 1A). In the source and destination port fields 152, 154, destination entity loads the values from fields 460, 472, respectively, of the path state setup message 400, that was used to establish the path states from destination entity 204 to source entity 202. Destination entity 202 similarly loads fields 122, 126 and 128 of the test message with the values from fields 470, 458 and 468, respectively, of the corresponding path setup message 400.

For the same reasons as described above, the test message from destination entity 204 to source entity 202 also follows the selected path. Upon receipt at source entity 202, the message is examined by the latency determination engine 340. In particular, latency determination engine 340 compares the time stamp from the second test message with the current time as provided by time management facility 342. By subtracting the time stamp from the current time, the latency determination engine 340 can calculate a more accurate latency for the selected path. This latency may then be displayed or printed for review by the service provider or network administrator.

In the preferred embodiment, the source and destination entities 202 and 204 release the path states previously established at the layer 3 devices following the latency determination. More specifically, the source and destination entities 202, 204 may formulate and transmit conventional "teardown" messages, in accordance with the RSVP protocol, that explicitly tear down the path states at devices 206, 210, 214 and 218. Alternatively, the source and destination entities 202, 204 may be configured to stop issuing additional path state reservation messages 500 once the test message has been returned to the source entity 202. In accordance with the RSVP protocol, if a layer 3 device stops receiving periodic RSVP Resv messages from a particular receiver, the path state for that receiver is automatically torn down. Thus, by not issuing additional path state reservation messages 500, source and destination entities 202, 204 will cause the corresponding path states to be torn down.

It should be understood that the test message need not be returned to source entity 202 in order for the latency of the selected path to be determined. For example, the source and destination entities 202, 204 may first synchronize their time management facilities or clocks. Thereafter, the destination entity 204 can accurately calculate the latency of the selected path itself, upon receipt of the test message, and thus there is no need to return the time record to source entity 202.

It should be further understood that the present invention may be implemented with other network communications protocols, such as version 6 of the IP protocol, the Connectionless Network Protocol (CLNP), IPX, AppleTalk, DecNet, etc.

It should be further understood that one or more network nodes may themselves be configured to include a latency determination engine and a path state message generator. In this embodiment, the respective network nodes formulate and transmit the path state setup and path state reservation messages.

The foregoing description has been directed to specific embodiments of the invention. It will be apparent, however, that other variations and modifications may be made to the described embodiments, with the attainment of some or all of their advantages. For example, other setup or signaling protocols besides RSVP may be utilized to setup the requisite path states at the devices along the selected path. [[Therefore, it is the object of the appended claims to cover all such variations and modifications as come within the true spirit and scope of the invention. ]]

Network Latency

Detailed Description of an Illustrative Embodiment

Figure 6:
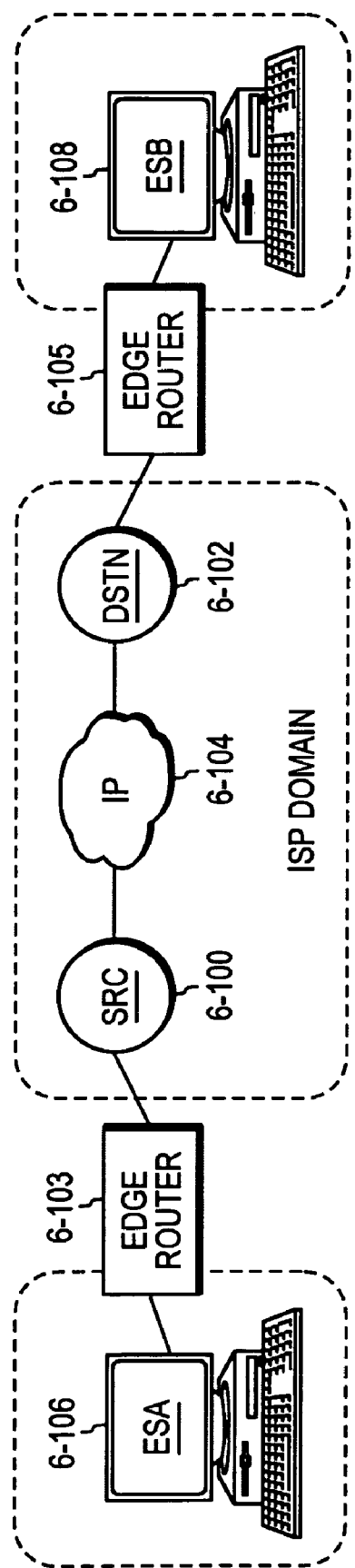
FIG. 6 is a block diagram of a largely conventional computer network including remote and local enterprise networks coupled via an Internet Service Provider domain in accordance with prior art.

FIG. 7 is a schematic block diagram showing the format of a novel Network Endpoint Control Protocol (NECP) control message 7-200 for authenticating users according to a preferred embodiment of this invention. The control message 7-200 includes a version field whose contents specify the version number 7-202 of the control protocol message 7-203 and an identification (ID) field 7-204 whose contents uniquely identifies each request/response transaction by a router (refer to FIG. 6). A length field 7-206 contains an indication of the total length of the control message, and a status field 7-208 contains information specifying the status of the request. Note that the status field is loaded by the responder and includes the following status codes: RTT_OK (request successful), RTT_AUTH_FAIL (authentication failure) and RTT_FAIL (request failure). A pad field 7-210 contains padding information needed to align the header and, finally, a control data field 7-212 includes command, length, status and data (CLSD) packets 7-214 that carry the commands to be executed by the responder.

FIG. 8 is a schematic block diagram showing the detailed format of the CLSD field 7-214, which includes a command field 8-300 whose contents specify a command code (type) for the responder operations. In addition, the CLSD field includes a length sub-field 8-302 that specifies a total length of the CLSD field and a status sub-field 8-304 whose contents include a two-byte error code if the responder cannot process the CLSD. An example of an error code is RTT_FAIL (command failure). A pad sub-field 8-306 is also provided that contains padding information needed to align the CLSD field header. The last sub-field of the CLSD field is a data field 8-308, which contains variable length data for the particular command. In addition the following exemplary structures are employed with reference also to the MD5 hashing checksum algorithm (to be described further below):

1. Authentication CLSD: Command=RTR_AUTH; Data: struct{uchar mode; /*authentication method used, currently only MD5*/uchar key_id; uchar info[16]; /*actual MD5 digest*/uchar pad[2]};
2. UDP Port Enable CLSD: Command=RTR_UDP_PORT_ENABLE; Data: struct{ipaddrtype dest; ushort port; ushort duration;/ *port enabled for how long */}; and
3. TCP connect port enable CLSD: Command=RTR_TCPCONN_PORT_ENABLE; Data: struct{ipaddrtype dest; ushort port; ushort duration;}.

Note that the control message format of FIG. 7 includes a control header portion 7-203 (including: Version, ID, Length, Status and Pad) along with a control data portion 7-212. Moreover, the control data portion 7-212 may contain multiple CLSD fields 7-214 or sub-messages, wherein each CLSD sub-message has a format as shown in FIG. 8. The control data portion or "payload" of the control message format includes multiple CLSD messages because there may be situations where the collector sends multiple data items to the responder. An example of this would be in the case of starting up a UDP port wherein the collector specifies a port number, a time interval in which the port will be active, the data size supported for each request from the collector to the responder, and the data size supported for each response from the responder to the collector. Each of these data items is included in a separate CLSD message, and in particular in the data portion of a CLSD message.

In accordance with the present invention, the novel control message formats and exchanges are employed to measure network latency response time between two end points in a network, wherein the end points are routers that are emulating protocols being executed by source and destination end stations. In this context, the network configuration of FIG. 6 maybe advantageously used when describing operation of the inventive protocol and message exchanges. Significantly, the inventive messages and exchanges enable collector and, more specifically responder software processes resident on the routers (6-103 and 6-105) to be dynamically invoked for purposes of measuring response time, thereby obviating the requirement of statistically configuring the routers to have these processes running for an extended period of time.

Operation of the inventive protocol and message exchange will now be described. The responder is initially enabled on a target destination router within an ISP domain to listen on, e.g., a UDP port such as Port 1967. The responder may be optionally configured with an MD5 hashing checksum key chain to use for any CP control message authentication. After enablement, the responder is able to receive the NECP control messages.

The collector constructs a command CLSD based on a particular probe type. If configured for authentication, the collector creates an authentication CLSD that contains an MD5 digest of the message. The source router sends out both CLSDs and one UDP datagram to the responder. If MD5 authentication is not configured, only one command CLSD is sent. Note that the CLSDs are encapsulated within the NECP control message (see FIGS. 7 and 8).

Upon receiving the control message, the destination router responder verifies authentication of the message if authentication is configured. If not, the responder insures that the collector has rights to access the port by scanning an ACL list. If either mode fails, the responder returns an authentication failure message (e.g. a message with status set to, for example, RTT_AUTH_FAIL) if authentication does not fail, the responder processes the control message by going through each CLSD in the control message one by one. That is, the responder starts up a server process in accordance with the data items (perimeters) sent by the collector in the control message. For example, the responder will set up a UDP server that listens on a particular port (Port 53) for a particular time period (5 seconds) and that server will accept a particular data size (10 bytes) from the collector and will return a particular data size (100 bytes) to the collector.

While individually processing the CLSD in the control message, the responder may encounter a CLD that it can not process. In that case, it returns a control message to the collector containing the original header and the failed CLSD with status set to the appropriate error code. However, if the responder is able to process all of the CLSDs, it sends back a control message containing just the header of the original message, with the status of the header set to "RTT_OK."

When the collector receives the RTT_OK response, it sends out a probe packet to the responder. This probe packet is the "data" message used to measure response time in the network. In the case of EDP, a UDP probe packet is timestamped at the collector prior to transmission to the responder and it likewise timestamped at the responder upon reception of the message. Note that the timestamp occurs at the point of reception at the router and prior to any processing of the message by the router. The responder then "responds" to the collector by timestamping the UDP packet at the point of transmitting it over the network ("when echoing" the message) and upon receiving the message, the collector likewise timestamps the echoed response. As a result, the collector can calculate the delta (difference) in timestamps to determine an accurate measurement of network response time. Note that the probe packet is a conventional IP data packet that is sent over the UDP transport in accordance with the EDP protocol.

FIG. 9 is a schematic block diagram of an IP packet 9-400 including an IP header 9-402, a UDP header 9-404 and a data field 9-406. Note that the data field 9-406 represents the payload of the UDP packet and that field is used for accommodating the timestamp when measuring network latencies and response times. In the illustrative embodiment, the timestamps are maintained locally at the collector and responder routers. That is, those routers calculate the differences between when the packets are received and transmitted and, accordingly, only the differences (delta) timestamps are stored in the payload of the UDP packet. Note that actual measurement technique (probe packet) is not part of the current invention. That is, the invention pertains to the control message format in exchange used to coordinate the end points by conforming the destination of the particular protocol being employed along with the port number and time interval within which the ports should be operational. Thus, the invention pertains to a network end point control (or coordination) protocol that has the acronym NECP.

Figures 10, 11:
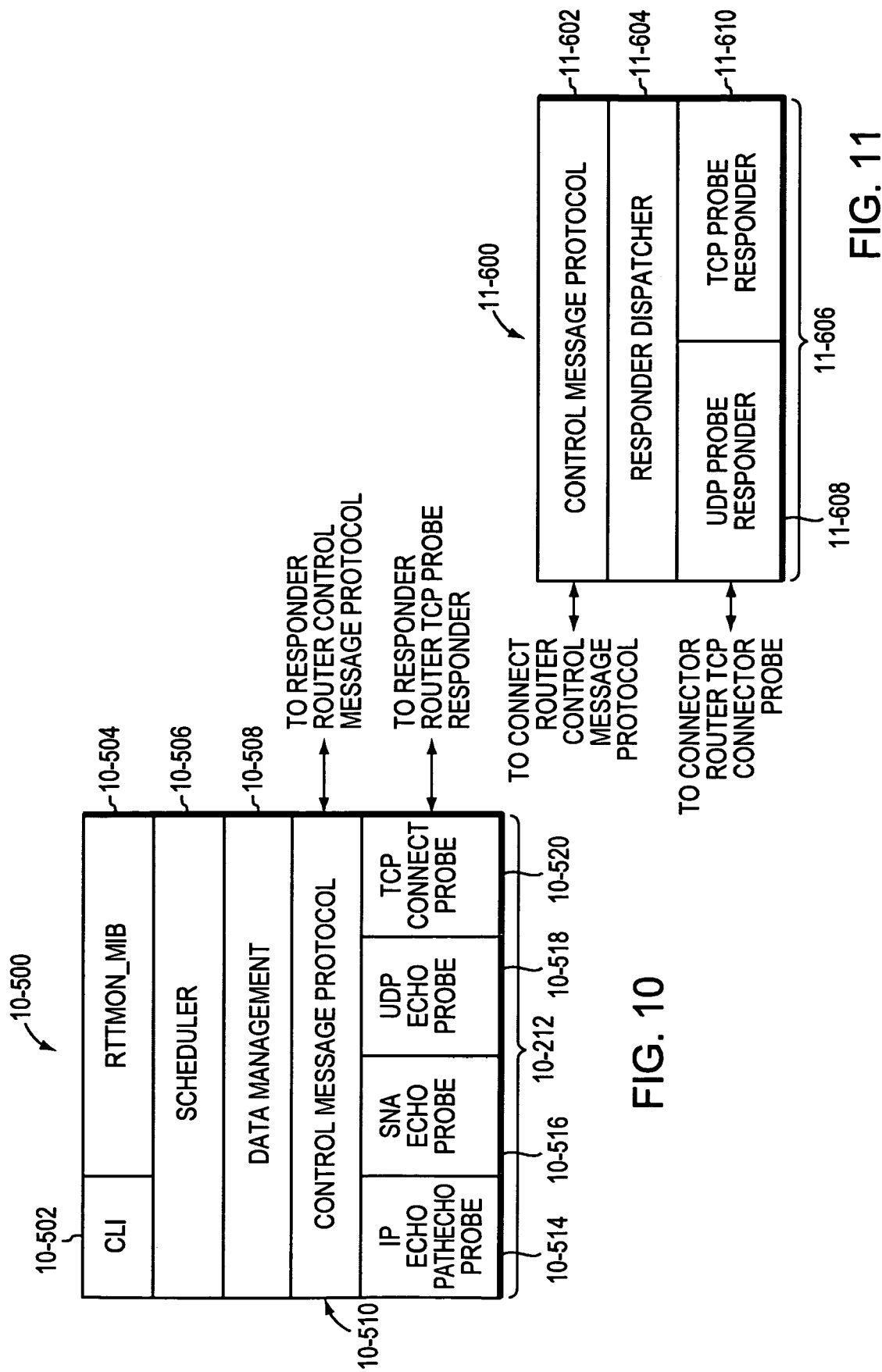
FIG. 10 is a block diagram of collector router architecture according to this invention.
FIG. 11 is a block diagram of a responder router architecture according to this invention.

FIG. 10 is a schematic block diagram illustrating the architecture of a collector router 10-500 in accordance with the present invention. The architecture is depicted in the form of a protocol stack having a plurality of layers or processes that perform specific network operations and functions. For example, the collector protocol stack includes a command line interface (CLI) process 10-502 and a management information base (MIB) process 10-504 functioning at a high level layer of the stack. The collector further includes conventional scheduling and management processes 10-506 and 10-508, respectively, operating within respect of layers of the stack. In accordance with the invention, a novel control message protocol layer 10-510 is provided that contains a collector process for generating novel NECP control messages. In addition, the collector protocol stack includes a plurality of processes 10-512 for generating probe packets in accordance with particular transports (such as UDP and TCP). According to this embodiment these processes particularly include an IP echo probe 10-514, an SNA echo probe 10-516, a UDP echo probe 10-518 and a TCP connect probe 10-520.

FIG. 11 is a schematic block diagram of the architecture of a responder router 11-600 in accordance with the invention. The responder also includes a novel control message protocol layer 11-602 having a particular responder process for responding to NECP control messages in accordance with the invention. A dispatcher layer 11-604 transfers messages. In addition, the responder includes a plurality of probe responder processes 11-606, one for each transport. These processes include a UDP probe responder 11-608 and a TCP responder 11-610. The responder according to alternate embodiments can likewise, services other transport protocols.

Figure 12:
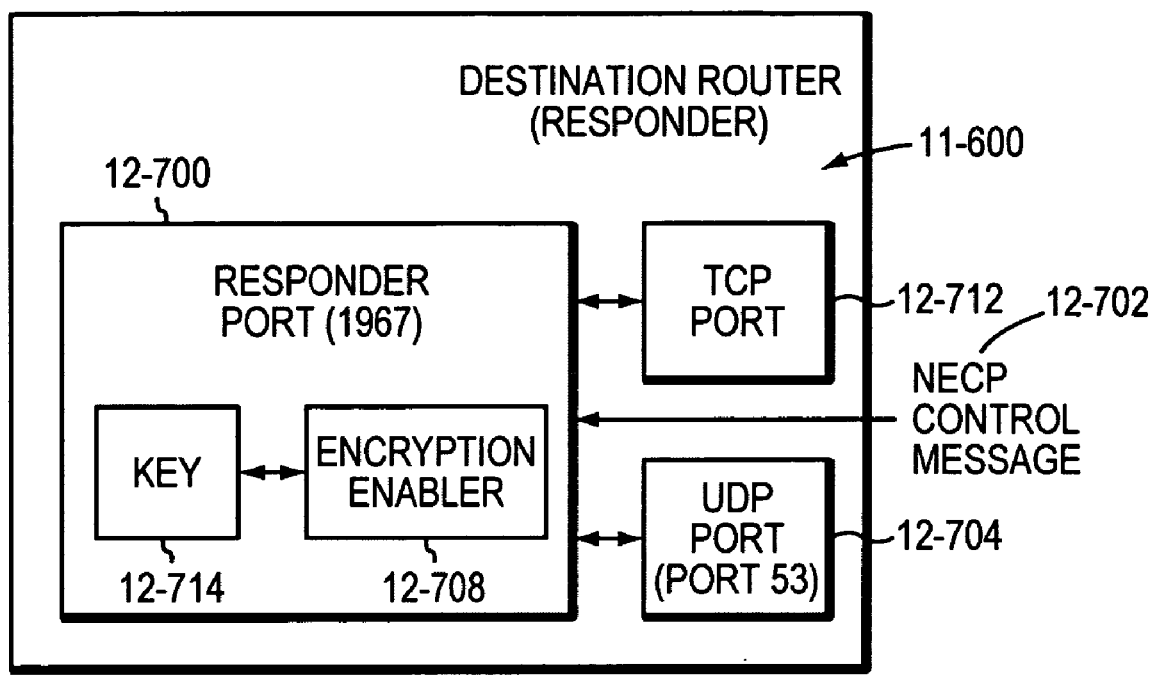
FIG. 12 is a block diagram of a responder port architecture including an encryption enabler according to this invention.

With reference generally to FIG. 12, in summary, the collector issues an NECP control message to the responder, instructing the responder to listen on a particular port (e.g. Port 53). The control message also includes a request for the responder to initiate a server process running the UDP protocol and, of course listening on Port 53. Note that there is a default "responder" Port 1967 (12-700) that the responder is initially configured to listen on to receive the NECP control message 12-702. If there is a responder configured on the destination router, the responder receives the control message request and starts up a UDP server process configured to listen on Port 53 (12-704). The client request may further specify a time interval (e.g. 30 seconds), within which the UDP port 12-704 will be enabled. That is, the novel protocol enables specification of a discrete time period within which the UDP server is running on a particular port to thereby obviate misuse by intruders. Furthermore, in order to insure authentication of the message exchange, the entire NECP control message may be encrypted or hashed with a particular algorithm—for example, the conventional MD5 hashing checksum algorithm. According to the invention, such encryption/hashing is optional. Therefore, an encryption enabler function 12-708 is provided to configure the responder for receiving encrypted messages. Note that the term "encryption, as used herein is expressly meant to encompass a variety of secure transmission techniques including traditional encryption, such as DES and the preferred hashing/checksum technique such as MD5. In the case of MD5, the subject message is hashed into a sequence of characters at the transmitting end, and then "verified" at the receiving end so as to be readable. The term "decryption," as used herein shall be taken to include this verification function. If "encryption" is so enabled, the responder port is pre-configured with an appropriate key to verify the message according to the preferred MD5 algorithm.

Note that the control message can specify either a UDP port 12-704 or a TCP port 12-712 on which the responder should listen. In the case of a UDP port request from the collector, the responder replies with the UDP (probe entering packet returned to the collector). If the request is to listen on a TCP port, the responder accepts the incoming TCP connection. Note also that if the encryption authentication mechanism is not enabled, the responder will utilize conventional Access Control Lists (ACL) in, for example, look-up table format, to determine whether or not a particular client is authorized to transmit on the port 1967. In addition, the specified time interval within the control message should be sufficient to enable response time measurements between the collector and responder. With further reference to FIG. 12, the collector will issue a novel control message to the responder 11-600 over a default responder port 12-700 in accordance with the present invention. If the responder is enabled for encryption communication, it will decrypt the control message according to the specified key retrieved from storage 12-714 and encryption/decryption algorithm resident in the responder. If the responder is not so configured, it will check a conventional ACL (not shown) to determine whether the client is authorized to communicate with the server. If the client is authorized or if the message is successfully decrypted, the responder interprets the message as instructions for starting up a particular port according to a particular protocol (TCP or UDP) and for a specified time period. The responder then responds to the collector in a manner dependent upon the particular protocol. In the case of a request to enable a UDP port for a particular time period, the responder processes a request and then sends back an acknowledgment to the collector. The collector receives the acknowledgment and then sends out a UDP probe packet to the responder. The responder then "echoes" the packet back to the collector, which keeps the result. In the case of enabling a TCP port connection, instead of sending a UDP probe packet, the collector sends a TCP connect probe packet to establish a TCP connection to the destination router. A TCP connect probe measures the time for the connection to be established and completed, and essentially, measures "virtual circuit" availability. In either case, the responder disables the port after it replies to the probe packet. In addition, the responder disables the port when the response period expires. The disabling feature of the present invention is a security measure intended to prevent unauthorized use of a responder port.

A requirement of coordinating end point in order to measure network latency and response time is that a server process must be spawned and started up at each port for which communication will take place. An advantage of the present invention is that a collector can dynamically invoke a server process at a particular port for a particular time interval, to thereby avoid unauthorized use of those ports by intruders. Another advantage of the invention is that it is not limited to just edge routers of an ISP domain. That is the inventor protocol and message exchange can be utilized between any two routers within any segment of the network. However, the invention is particularly useful for ISP providers because they can isolate their portion of the network from their customers' networks and be able to diagnosis any bottlenecks or problems that are the ISP responsibility.

The foregoing has been a detailed description of a preferred embodiment of the invention. Various modifications and additions can be made without departing from its spirit and scope. For example, a variety of transports and protocols aside from those specifically enumerated can be employed according to an alternate embodiment. Additional routers and switching layers can be implemented in a network configured according to this invention. Finally, the functional blocks and associated procedures described herein are expressly contemplated as being implemented in electronic hardware, computer readable media (software) or a combination of hardware and software. Accordingly, this description is meant to be taken only by way of example.

Therefore, it is the object of the appended claims to cover all such variations and modifications as come within the true spirit and scope of the invention.

What is claimed is:

1. A method for operating a computer network, comprising:

transmitting, by a source router, a first message to be received by another router of the computer network, the first message to activate a server process on the another router to listen on a particular port for a designated time period for the another router to receive a second message;

receiving the second message by the another router during the designated time period; and responding, by the another router, to the second message, in response to receiving the second message during the designated time period.

2. The method as in claim 1 further comprising:

receiving a third message after expiration of the designated time period; and ignoring the third message in response to receiving the third message after expiration of the designated time period.

3. The method as in claim 1 wherein the second message is a test message containing a time stamp, the another router is a destination router, and the method further comprises:

establishing a path through the computer network, the path established through a plurality of routers, the path connecting the source router with the destination router;

transmitting the test message containing the time stamp by the source router, the test message traveling along the path to the destination router;

transmitting, by the destination router, in response to receiving the test message, a reply message to travel backwards along the path to the source router;

receiving, by the source router, the reply message at a received time; and calculating a network latency in response to the time stamp and the received time.

4. A computer network, comprising:

means for transmitting, at a source router, a first message to be received by another router of the computer network, the first message to activate a server process on the another router to listen on a particular port for a designated time period for the another router to receive a second message;

means for receiving the second message, at the another router, during the designated time period; and means for responding, at the another router, to the second message, in response to receiving the second message during the designated time period.

5. The computer network as in claim 4, further comprising:

means for receiving a third message after expiration of the designated time period; and means for ignoring the third message in response to receiving the third message after expiration of the designated time period.

6. The computer network as in claim 4 wherein the second message is a test message containing a time stamp, the another router is a destination router, and the computer network further comprises:

means for establishing a path through the computer network, the path established through a plurality of routers, the path connecting the source router with the destination router;

means for transmitting the test message containing the time stamp, at the source router, the test message traveling along the path to the destination router;

means for transmitting, at the destination router, in response to receiving the test message, a reply message to travel backwards along the path to the source router;

means for receiving, at the source router, the reply message at a received time; and means for calculating a network latency in response to the time stamp and the received time.

7. A computer network, comprising:

a source router to transmit a first message to be received by another router of the computer network, the first message to activate a server process on the another router to listen on a particular port for a designated time period for the another router to receive a second message;

the another router capable of receiving a second message during the designated time period; and the another router to, in response to receiving the second message during the designated time period, respond to the second message.

8. The computer network as in claim 7, further comprising:

the another router to receive a third message after expiration of the designated time period; and the another router to ignore the third message in response to receiving the third message after expiration of the designated time period.

9. The computer network as in claim 7 wherein the second message is a test message containing a time stamp, the another router is a destination router, and the computer network further comprises:

a path established through a plurality of routers in the computer network, the path connecting the source router with the destination router;

the source router to transmit the test message containing the time stamp, the test message traveling along the path to the destination router;

the destination router to transmit, in response to receiving the test message, a reply message to travel backwards along the path to the source router;

the source router to receive the reply message at a received time; and a processor to calculate a network latency in response to the time stamp and the received time.

10. A computer readable media comprising:

said computer readable media containing instructions for execution in a processor for the practice of a method for operating a computer network, the method having the steps of, transmitting, by a source router, a first message to be received by another router of the computer network, the first message to activate a server process on the another router to listen for a designated time period for the another router to receive a second message;

receiving the second message by the another router during the designated time period; and responding, by the another router, to the second message in response to receiving the second message during the designated time period.

11. A method for operating a router in a computer network, comprising:

receiving a first message;

activating a server process, in response to receiving the first message, the server process to listen on a particular port of the router for a designated time period for a second message;

receiving the second message on the particular port within the designated time period; and responding by the router to the second message in response to receiving the second message on the particular port during the designated time period.

12. The method as in claim 11, further comprising:

receiving a third message on the particular port after expiration of the designated time period; and ignoring the third message in response to receiving the third message after expiration of the designated time period.

13. The method as in claim 11, further comprising:

after responding to the second message, disabling the particular port.

14. The method as in claim 11, further comprising:
upon expiration of the designated time period, disabling the particular port.

15. The method as in claim 11, wherein the first message has been subject to encryption at a source and the method further comprises:
decrypting the first message by the router.

16. The method as in claim 11, further comprising:
accessing an Access Control List (ACL) to determine the first message originates from a source that is authorized to communicate with the router.

17. The method as in claim 11, wherein the server process is a User Datagram Protocol (UDP) server process and the particular port is a UDP port.

18. The method of claim 17, wherein the second message is a UDP probe packet used to determine a network response time.

19. The method as in claim 11, wherein the server process is configured to accept a Transmission Control Protocol (TCP) connection and the particular port is a TCP port.

20. The method as in claim 19, wherein the second message is a TCP connect probe message used to determine a time needed for a TCP connection to be established.

21. The method as in claim 11, wherein the first message is a Network Endpoint Connection Protocol (NECP) message that includes one or more Command Length Status Data (CLSD) messages encapsulated therein.

22. The method as in claim 11, wherein the first message is received on a responder port separate from the particular port.

23. A router in a computer network, comprising:
means for receiving a first message;
means for activating a server process, in response to receiving the first message, the server process to listen for a designated time period on a particular port of the router for a second message;
means for receiving the second message on the particular port within the designated time period;
means for responding by the router to the second message in response to receiving the second message on the particular port during the designated time period.

24. The router as in claim 23, further comprising:
means for receiving a third message on the particular port after expiration of the designated time period; and
means for ignoring the third message in response to receiving the third message after expiration of the designated time period.

25. A router in a computer network, comprising:
a communications interface configured to receive a first message;
a processor configured to activate a server process, in response to receipt of the first message, the server process to listen on a particular port of the router for a designated time period for a second message;
the communications interface configured to receive the second message within the designated time period;
the processor configured to respond to the second message in response to receipt of the second message during the designated time period.

26. The router as in claim 25, further comprising:
the communications interface configured to receive a third message after expiration of the designated time period; and
the processor configured to ignore the third message in response to receipt of the third message after expiration of the designated time period.

27. The router as in claim 25, wherein the server process is a User Datagram Protocol (UDP) server process, the particular port is a UDP port, the second message is a UDP probe packet.

28. The router as in claim 25, wherein the server process is configured to accept a Transmission Control Protocol (TCP) connection, the particular port is a TCP port, and the second message is a TCP connect probe message.

29. The router as in claim 25, wherein the first message is a Network Endpoint Connection Protocol (NECP) message that includes one or more Command Length Status Data (CLSD) messages encapsulated therein.

30. The router as in claim 25, further comprising:
a responder port, different than the particular port, configured to receive the first message at the router.

31. A computer readable media comprising:
said computer readable media containing instructions for execution in a processor for the practice of a method for operating a router in a computer network, the method having the steps of,
receiving a first message;
activating a server process, in response to receiving the first message, the server process to listen on a particular port of the router for a designated time period for a second message;
receiving the second message on the particular port within the designated time period; and
responding by the router to the second message in response to receiving the second message on the particular port during the designated time period.

32. A method, comprising:
receiving, on a responder port, a first message that includes a request for activation of a server process to listen on a particular User Datagram Protocol (UDP) or Transmission Control Protocol (TCP) port separate from the responder port for a designated period of time;
activating the server process, in response to receiving the first message, the server process to listen on the particular UDP or TCP port for the designated time period;
receiving a second message on the particular UDP or TCP port within the designated time period, the second message being a UDP or TCP message used in determination of a network latency; and
responding to the second message in response to receiving the second message on the particular UDP or TCP port during the designated time period; and
after responding to the second message, disabling the particular port.

* * * * *

UNITED STATES PATENT AND TRADEMARK OFFICE
CERTIFICATE OF CORRECTION

PATENT NO. : 7,787,404 B2 Page 1 of 1
APPLICATION NO. : 11/416708
DATED : August 31, 2010
INVENTOR(S) : Kui Zhang It is certified that error appears in the above-identified patent and that said Letters Patent is hereby corrected as shown below:

Col. 3, Line 6, please remove the "." after the word "options"

Col. 7, Line 56, please remove the "," after the word "responder"

Col. 8, Line 31, please replace "(ITP)" with "(IP)"

Col. 13, Line 31, please remove the "," after the word "by"

Signed and Sealed this

Ninth Day of November, 2010

David J. Kappos
*Director of the United States Patent and Trademark Office*